(12) United States Patent
Tsunoya et al.

(10) Patent No.: US 10,596,800 B2
(45) Date of Patent: Mar. 24, 2020

(54) THREE-DIMENSIONAL SHAPED ARTICLE PRODUCTION METHOD, THREE-DIMENSIONAL SHAPED ARTICLE PRODUCTION APPARATUS, AND THREE-DIMENSIONAL SHAPED ARTICLE

(71) Applicant: Seiko Epson Corporation, Tokyo (JP)

(72) Inventors: Akihiko Tsunoya, Okaya (JP); Eiji Okamoto, Matsumoto (JP)

(73) Assignee: Seiko Epson Corporation (JP)

( * ) Notice: Subject to any disclaimer, the term of this patent is extended or adjusted under 35 U.S.C. 154(b) by 88 days.

(21) Appl. No.: 15/441,728

(22) Filed: Feb. 24, 2017

(65) Prior Publication Data

US 2017/0252969 A1 Sep. 7, 2017

(30) Foreign Application Priority Data

Mar. 7, 2016 (JP) .................... 2016-043676

(51) Int. Cl.
| | | |
|---|---|---|
| *B33Y 10/00* | (2015.01) | |
| *B33Y 30/00* | (2015.01) | |
| *B33Y 50/02* | (2015.01) | |
| *B29C 64/112* | (2017.01) | |
| *B29C 64/386* | (2017.01) | |
| *B29K 105/16* | (2006.01) | |

(52) U.S. Cl.
CPC ............ *B33Y 10/00* (2014.12); *B29C 64/112* (2017.08); *B29C 64/386* (2017.08); *B33Y 30/00* (2014.12); *B33Y 50/02* (2014.12); *B29K 2105/16* (2013.01)

(58) Field of Classification Search
CPC ....... B33Y 10/00; B33Y 50/05; B29C 64/112; B29C 64/386
See application file for complete search history.

(56) References Cited

U.S. PATENT DOCUMENTS

| | | |
|---|---|---|
| 5,260,009 A | 11/1993 | Penn |
| 5,594,652 A | 1/1997 | Penn et al. |
| 6,169,605 B1 | 1/2001 | Penn et al. |
| 6,175,422 B1 | 1/2001 | Penn et al. |

(Continued)

FOREIGN PATENT DOCUMENTS

| | | |
|---|---|---|
| EP | 0 581 445 A1 | 2/1994 |
| EP | 2 902 174 A1 | 8/2015 |

(Continued)

*Primary Examiner* — Kelly M Gambetta
(74) *Attorney, Agent, or Firm* — Harness, Dickey & Pierce, P.L.C.

(57) ABSTRACT

A three-dimensional shaped article production method according to the invention includes a step of forming a layer by ejecting a composition containing particles using a dispenser, a step of determining the height of the layer, wherein a stacked body includes a layer which has a first portion corresponding to a portion to become an actual body part of the three-dimensional shaped article to be formed using an actual body part forming composition, and a second portion corresponding to a portion to become a sacrificial part to be formed using a sacrificial part forming composition, the supply amount of the sacrificial part forming composition to be ejected onto the second portion of the n-th layer in the step of forming the (n+1)th layer is adjusted based on the information of the height of the surface of the second portion of the n-th layer.

9 Claims, 11 Drawing Sheets

(56) References Cited

U.S. PATENT DOCUMENTS

| | | |
|---|---|---|
| 9,738,032 B2 | 8/2017 | Folkins et al. |
| 2002/0008335 A1* | 1/2002 | Leyden .................. B29C 41/12 |
| | | 264/494 |
| 2006/0158456 A1 | 7/2006 | Zinniel et al. |
| 2006/0172168 A1 | 8/2006 | Wright et al. |
| 2010/0040767 A1 | 2/2010 | Uibel et al. |
| 2015/0210011 A1* | 7/2015 | Conrow ................ B29C 64/386 |
| | | 264/40.4 |
| 2015/0266242 A1* | 9/2015 | Comb .................. B29C 64/393 |
| | | 264/40.1 |
| 2015/0298394 A1 | 10/2015 | Sheinman |
| 2015/0352781 A1 | 12/2015 | Hosier et al. |
| 2015/0352839 A1 | 12/2015 | Folkins et al. |
| 2017/0008231 A1 | 1/2017 | Hirabayashi et al. |
| 2018/0229425 A1 | 8/2018 | Sheinman |

FOREIGN PATENT DOCUMENTS

| | | |
|---|---|---|
| JP | H07-040445 A | 2/1995 |
| JP | 11-042714 A | 2/1999 |
| JP | 2003-181941 A | 7/2003 |
| JP | 2005-138422 A | 6/2005 |
| JP | 2005-335203 A | 12/2005 |
| JP | 2008-184622 A | 8/2008 |
| JP | 2012-030530 A | 2/2012 |
| JP | 2013-075392 A | 4/2013 |
| JP | 2015-196267 A | 11/2015 |
| JP | 2015-212060 A | 11/2015 |
| JP | 2016-011331 A | 1/2016 |
| WO | WO-2015-056230 A1 | 4/2015 |

\* cited by examiner

THREE-DIMENSIONAL SHAPED ARTICLE PRODUCTION METHOD, THREE-DIMENSIONAL SHAPED ARTICLE PRODUCTION APPARATUS, AND THREE-DIMENSIONAL SHAPED ARTICLE

BACKGROUND

1. Technical Field

The present invention relates to a three-dimensional shaped article production method, a three-dimensional shaped article production apparatus, and a three-dimensional shaped article.

2. Related Art

There has been known a method for forming a three-dimensional shaped article based on the model data of a three-dimensional object formed using, for example, a three-dimensional CAD software, a three-dimensional scanner, or the like.

As a method for forming a three-dimensional shaped article, there has been known a stacking method (three-dimensional shaping method). In the stacking method, in general, after the model data of a three-dimensional object is divided into a large number of two-dimensional cross-sectional layer data (slice data), while sequentially shaping cross-sectional members corresponding to the respective two-dimensional cross-sectional layer data, the cross-sectional members are sequentially stacked, whereby a three-dimensional shaped article is formed.

According to the stacking method, a three-dimensional shaped article can be immediately formed as long as there is model data of a three-dimensional shaped article to be shaped, and it is not necessary to form a mold or the like prior to shaping, and therefore, it is possible to form a three-dimensional shaped article rapidly at low cost. Further, since the formation is performed by staking the layers of thin plate-shaped cross-sectional members one by one, even a complicated object having, for example, an internal structure can be formed as an integrated shaped article without being divided into a plurality of components.

As such a stacking method, there has been known a technique for producing a three-dimensional shaped article by repeating a process for forming a film (layer) by ejecting a material (slurry) containing a powder and a solvent from a dispenser (see, for example, JP-A-2015-196267 (Patent Document 1)).

However, in such a stacking method, the thickness of a layer to be formed sometimes deviates from a target value. Such a deviation of the thickness causes a decrease in the dimensional accuracy of the three-dimensional shaped article. In particular, by accumulating the deviation of the thickness due to stacking of layers, the dimensional accuracy of the finally obtained three-dimensional shaped article is sometimes greatly decreased. Such a problem occurs more significantly when the number of stacked layers is large.

SUMMARY

An advantage of some aspects of the invention is to provide a three-dimensional shaped article production method capable of efficiently producing a three-dimensional shaped article having high dimensional accuracy, to provide a three-dimensional shaped article production apparatus capable of efficiently producing a three-dimensional shaped article having high dimensional accuracy, and to provide a three-dimensional shaped article having high dimensional accuracy.

The advantage can be achieved by the following configurations.

A three-dimensional shaped article production method according to an aspect of the invention is a method for producing a three-dimensional shaped article by stacking layers and includes a layer formation step of forming each layer in a predetermined pattern by ejecting a composition containing particles and a solvent using a dispenser, a measurement step of determining the height of the layer, and a bonding step of subjecting a stacked body including a plurality of layers to a bonding treatment for bonding the particles, wherein at least some of the layers constituting the stacked body have a first portion corresponding to a portion to become an actual body part of the three-dimensional shaped article to be formed using an actual body part forming composition containing first particles and a first solvent, and a second portion corresponding to a portion to become a sacrificial part to be formed using a sacrificial part forming composition containing second particles and a second solvent, and in the case where when n represents an arbitrary integer of 1 or more, an n-th layer which is the layer in the n-th position has the second portion, and the second portion of an (n+1)th layer which is the layer in the (n+1)th position is formed in at least part of the surface of the second portion of the n-th layer, the supply amount of the sacrificial part forming composition per unit area to be ejected onto the second portion of the n-th layer from the dispenser in the layer formation step of forming the (n+1)th layer is adjusted based on the information of the height of the surface of the second portion of the n-th layer.

According to this configuration, a three-dimensional shaped article production method capable of efficiently producing a three-dimensional shaped article having high dimensional accuracy can be provided.

In the three-dimensional shaped article production method according to the aspect of the invention, it is preferred that the supply amount of the sacrificial part forming composition per unit area to be ejected onto the second portion of the n-th layer is adjusted by adjusting the number of liquid droplets of the sacrificial part forming composition per unit area to be ejected onto the n-th layer from the dispenser.

According to this configuration, the supply amount of the sacrificial part forming composition can be easily and simply adjusted. Further, the method can be favorably applied to the ejection of various types of sacrificial part forming compositions.

In the three-dimensional shaped article production method according to the aspect of the invention, it is preferred that in the layer formation step of forming the n-th layer, the number of liquid droplets per unit area of the sacrificial part forming composition is set to a predetermined value, and in the layer formation step of forming the (n+1)th layer, the ejection amount of the sacrificial part forming composition per unit area is adjusted by selecting at least one of a value which is smaller than the predetermined value and a value which is larger than the predetermined value as the number of liquid droplets per unit area of the sacrificial part forming composition.

According to this configuration, the dimensional accuracy of the three-dimensional shaped article can be further enhanced.

In the three-dimensional shaped article production method according to the aspect of the invention, it is preferred that the supply amount of the sacrificial part forming composition per unit area to be ejected onto the second portion of the n-th layer is adjusted by selecting waveform data when the sacrificial part forming composition is ejected from the dispenser from a data group including a plurality of pieces of waveform data.

According to this configuration, even if it is necessary to change the ejection amount of the sacrificial part forming composition, the sacrificial part forming composition can be ejected at a high frequency, and thus, the productivity of the three-dimensional shaped article can be increased.

In the three-dimensional shaped article production method according to the aspect of the invention, it is preferred that the data group includes reference driving waveform data for a predetermined ejection amount, driving waveform data for a decreased amount such that the ejection amount is smaller than that in the case of using the reference driving waveform data, and driving waveform data for an increased amount such that the ejection amount is larger than that in the case of using the reference driving waveform data, and in the layer formation step of forming the n-th layer, the reference driving waveform data is used, and in the layer formation step of forming the (n+1)th layer, the ejection amount of the sacrificial part forming composition per unit area is adjusted by using at least one of the driving waveform data for a decreased amount and the driving waveform data for an increased amount.

According to this configuration, the dimensional accuracy of the three-dimensional shaped article can be further enhanced.

In the three-dimensional shaped article production method according to the aspect of the invention, it is preferred that in the measurement step, the height of the surface of a portion which is a portion where the second portion of the (n+1)th layer is to be formed in the second portion of the n-th layer, and overlaps a portion where the first portion of an (n+2)th layer which is the layer in the (n+2)th position is to be formed when the layer is viewed in a plan view is measured.

According to this configuration, the dimensional accuracy of the three-dimensional shaped article can be further enhanced.

In the three-dimensional shaped article production method according to the aspect of the invention, it is preferred that in the measurement step, the height is determined in a plurality of places to come into contact with the (n+1)th layer in the surface of the n-th layer.

According to this configuration, the height of the layer in the respective portions can be individually adjusted, and thus, the dimensional accuracy of the three-dimensional shaped article can be further enhanced.

In the three-dimensional shaped article production method according to the aspect of the invention, it is preferred that in the measurement step, the height of the surface is also measured in a portion where the first portion of the (n+1)th layer is to be formed in the second portion of the n-th layer.

According to this configuration, the dimensional accuracy of the three-dimensional shaped article can be further enhanced.

In the three-dimensional shaped article production method according to the aspect of the invention, it is preferred that in the measurement step, the height of the surface is also measured in the first portion of the n-th layer.

According to this configuration, the dimensional accuracy of the three-dimensional shaped article can be further enhanced.

In the three-dimensional shaped article production method according to the aspect of the invention, it is preferred that in the measurement step for the n-th layer is performed after performing a solvent removal step of removing the solvent from a measurement portion of the n-th layer.

According to this configuration, the effect of the deformation (change in the thickness) of the n-th layer after performing the measurement step can be prevented, and the application amount of the composition in the layer formation step of forming the (n+1)th layer can be more appropriately determined. As a result, the dimensional accuracy of the three-dimensional shaped article can be further enhanced.

A three-dimensional shaped article production apparatus according to an aspect of the invention includes a first dispenser which ejects an actual body part forming composition containing first particles and a first solvent, a second dispenser which ejects a sacrificial part forming composition containing second particles and a second solvent, a measurement unit which determines the height of the surface of a layer formed using the sacrificial part forming composition, and a control section capable of adjusting the supply amount of the sacrificial part forming composition per unit area to the layer for which the height of the surface has been measured from the second dispenser based on the result of measurement made by the measurement unit.

According to this configuration, a three-dimensional shaped article production apparatus capable of efficiently producing a three-dimensional shaped article having high dimensional accuracy can be provided.

In the three-dimensional shaped article production apparatus according to the aspect of the invention, it is preferred that the apparatus further includes a bonding unit which applies energy for bonding the first particles to a stacked body obtained by stacking the layers.

According to this configuration, a three-dimensional shaped article can be produced in the same apparatus without taking the stacked body obtained by stacking a plurality of layers outside the three-dimensional shaped article production apparatus, and therefore, the productivity of the three-dimensional shaped article can be further increased.

A three-dimensional shaped article according to an aspect of the invention is produced using the three-dimensional shaped article production apparatus according to the aspect of the invention.

According to this configuration, a three-dimensional shaped article having high dimensional accuracy can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments will be described in detail with reference to the accompanying drawings.

Three-Dimensional Shaped Article Production Method

First, a three-dimensional shaped article production method according to the invention will be described.

Figure 1:
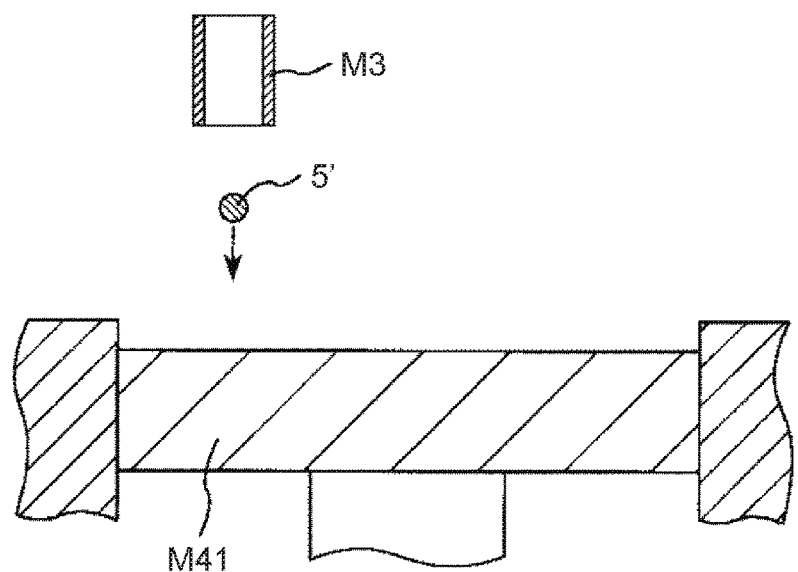
FIG. 1 is a vertical cross-sectional view schematically showing a step (layer formation step) of a preferred embodiment of a three-dimensional shaped article production method according to the invention.
Figure 2:
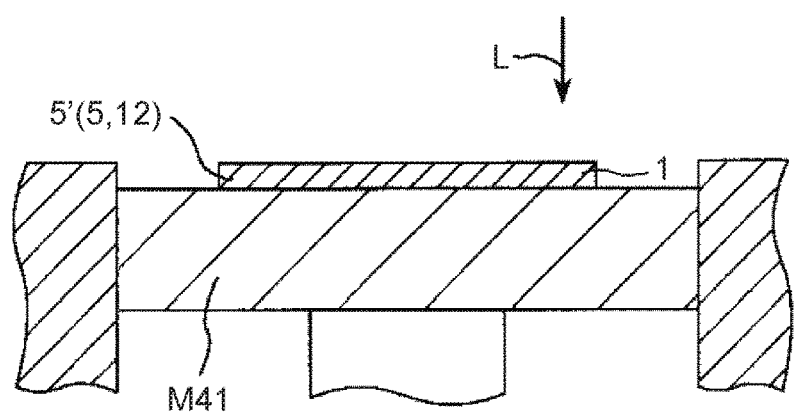
FIG. 2 is a vertical cross-sectional view schematically showing a step (measurement step) of a preferred embodiment of a three-dimensional shaped article production method according to the invention.
Figure 3:
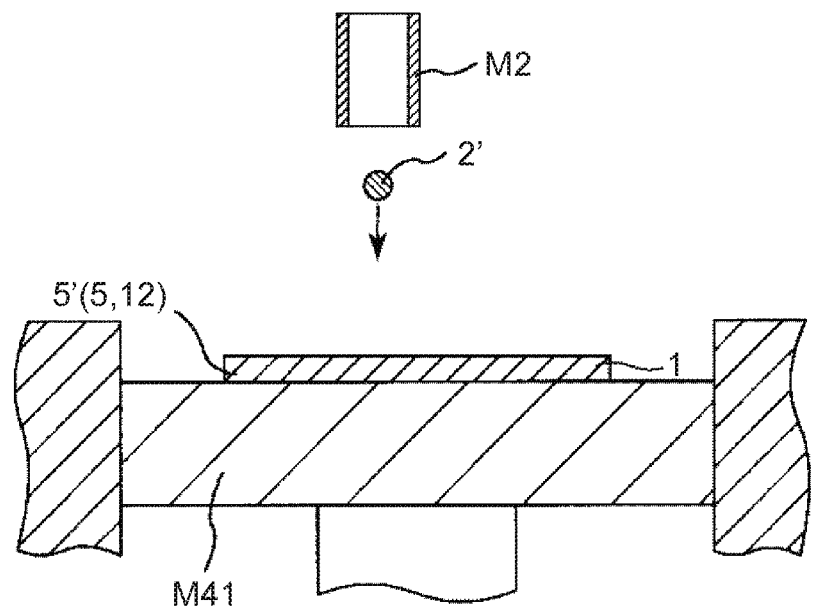
FIG. 3 is a vertical cross-sectional view schematically showing a step (layer formation step) of a preferred embodiment of a three-dimensional shaped article production method according to the invention.
Figure 4:
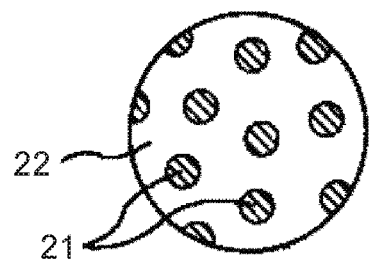
FIG. 4 is an enlarged view showing a state of a composition (actual body part forming composition) to be ejected.
Figure 5:
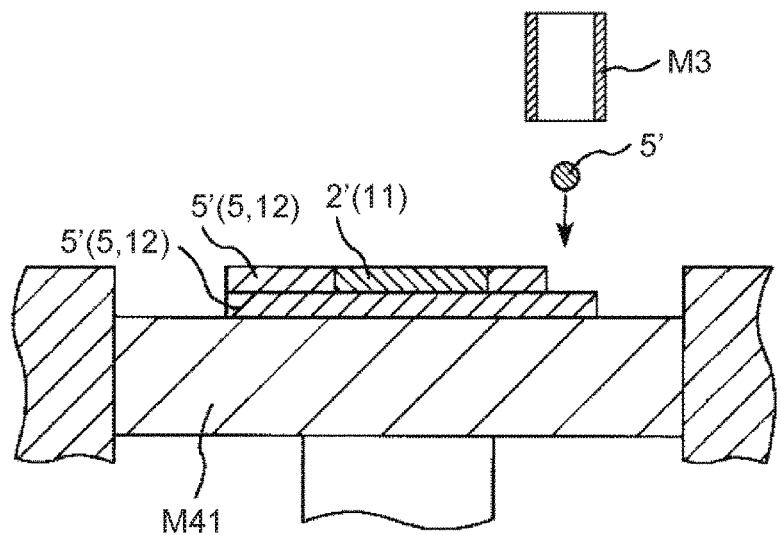
FIG. 5 is a vertical cross-sectional view schematically showing a step (layer formation step) of a preferred embodiment of a three-dimensional shaped article production method according to the invention.
Figure 6:
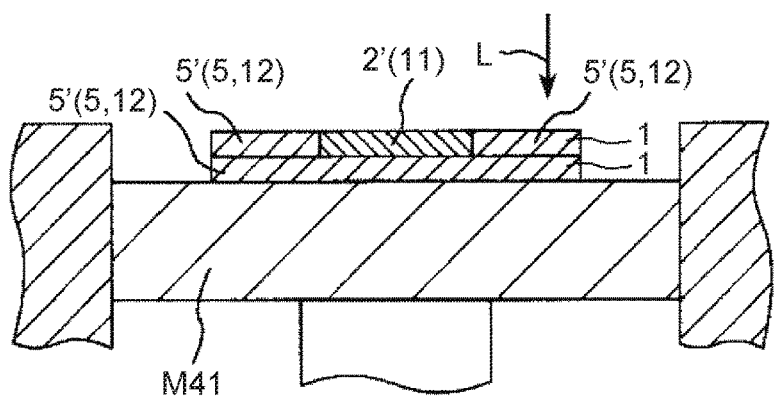
FIG. 6 is a vertical cross-sectional view schematically showing a step (measurement step) of a preferred embodiment of a three-dimensional shaped article production method according to the invention.
Figure 7:
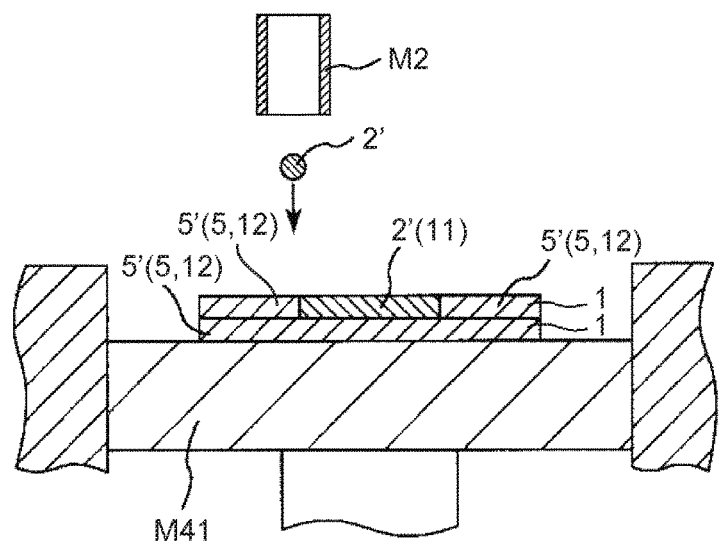
FIG. 7 is a vertical cross-sectional view schematically showing a step (layer formation step) of a preferred embodiment of a three-dimensional shaped article production method according to the invention.
Figure 8:
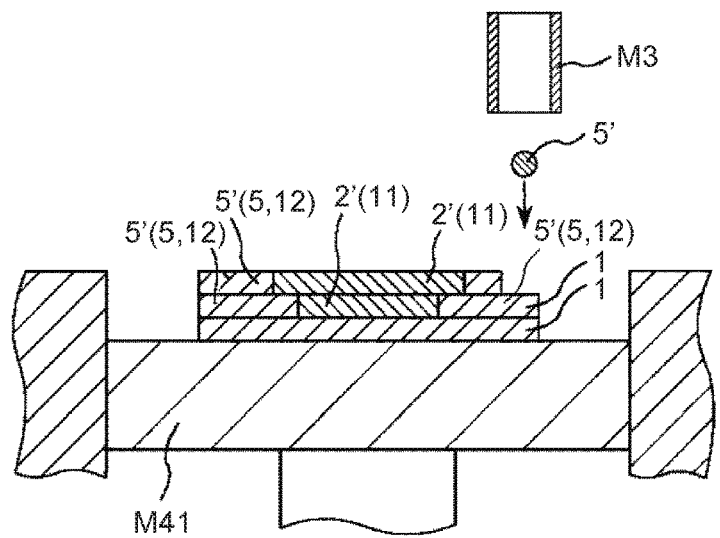
FIG. 8 is a vertical cross-sectional view schematically showing a step (layer formation step) of a preferred embodiment of a three-dimensional shaped article production method according to the invention.
Figure 9:
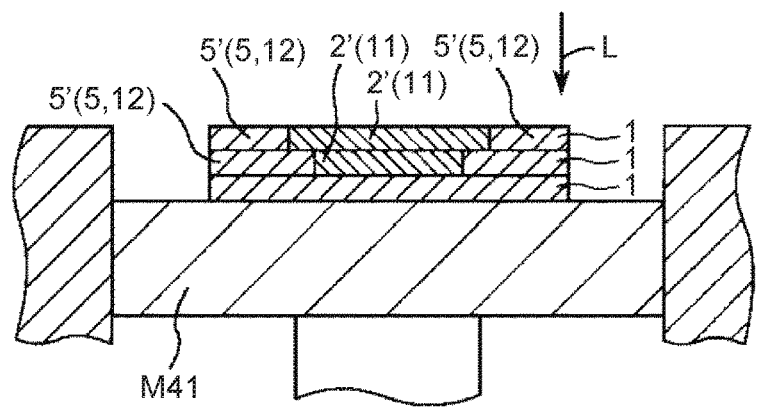
FIG. 9 is a vertical cross-sectional view schematically showing a step (measurement step) of a preferred embodiment of a three-dimensional shaped article production method according to the invention.
Figure 13:
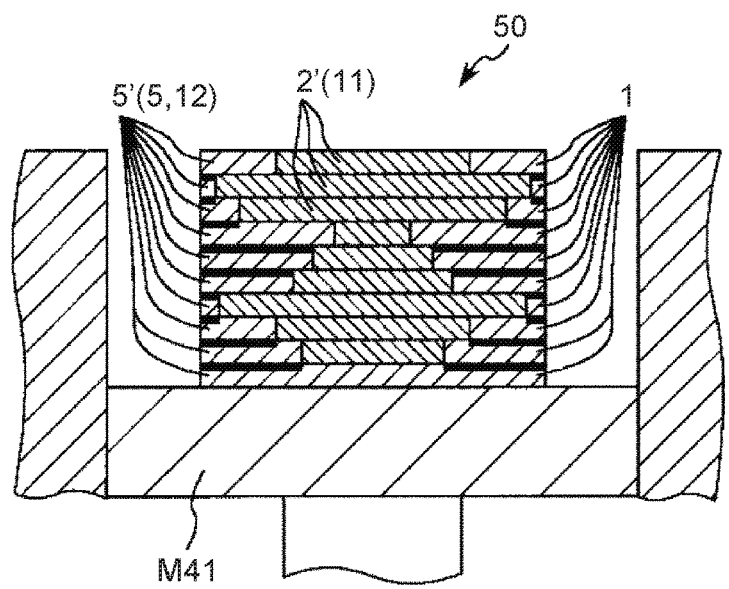
FIG. 13 is a view showing a region for which the information of the height is to be obtained in the measurement step for determining the ejection amount of a sacrificial part forming composition onto a second portion of an n-th layer in an exaggerated manner with a bold line.
Figure 14:
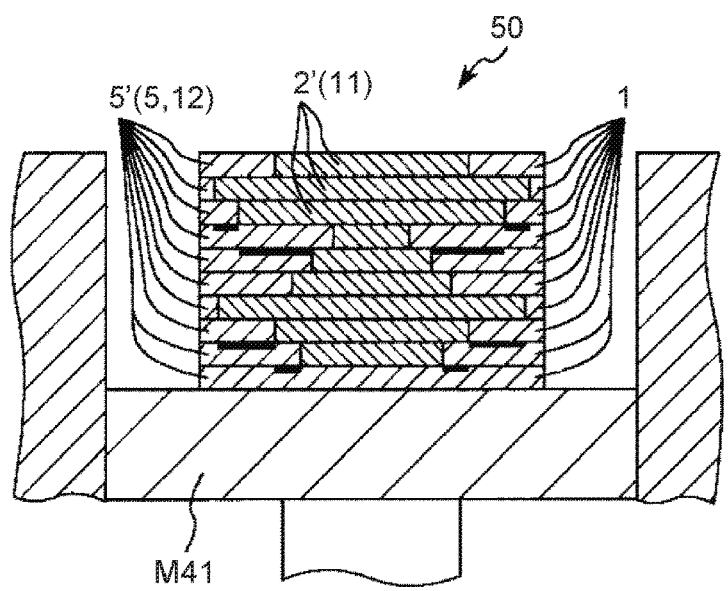
FIG. 14 is a view showing a portion which is a portion where a second portion of an (n+1)th layer is to be formed in the second portion of the n-th layer, and overlaps a portion where a first portion of an (n+2)th layer is to be formed when the layer is viewed in a plan view in an exaggerated manner with a bold line.
Figure 15:
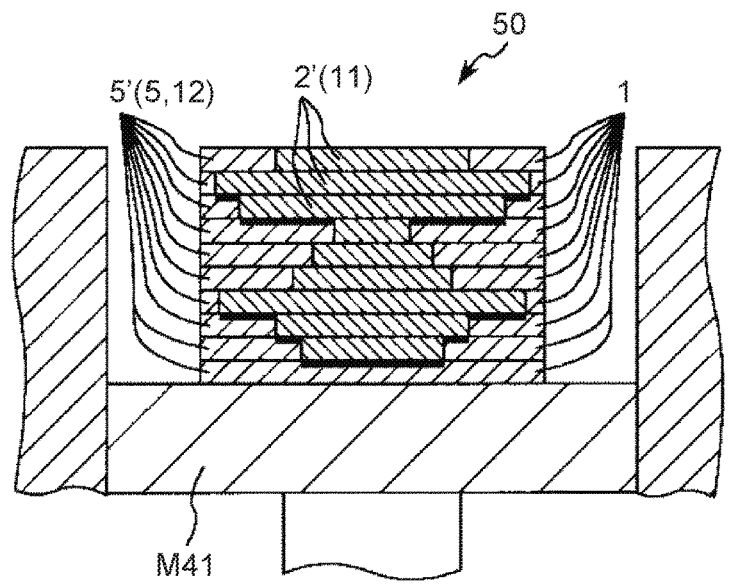
FIG. 15 is a view showing a portion where a first portion of the (n+1)th layer is to be formed in the second portion of the n-th layer in an exaggerated manner with a bold line.
Figure 16:
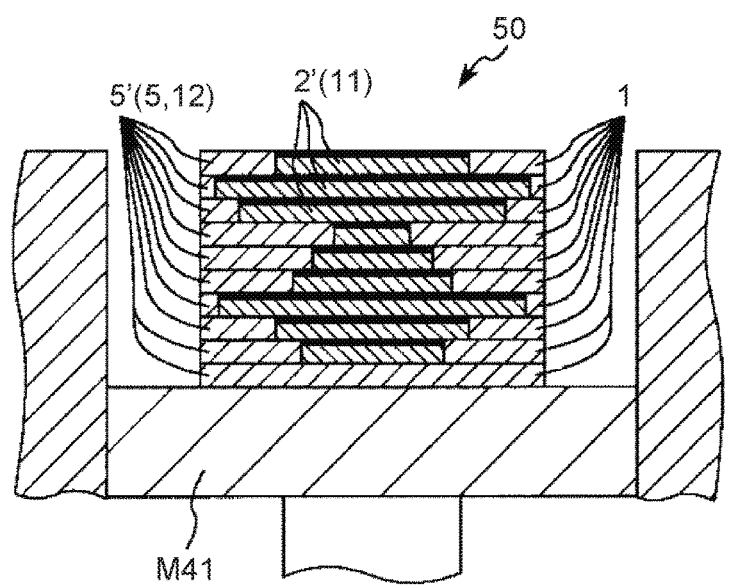
FIG. 16 is a view showing a first portion of the n-th layer in an exaggerated manner with a bold line.
Figure 17:
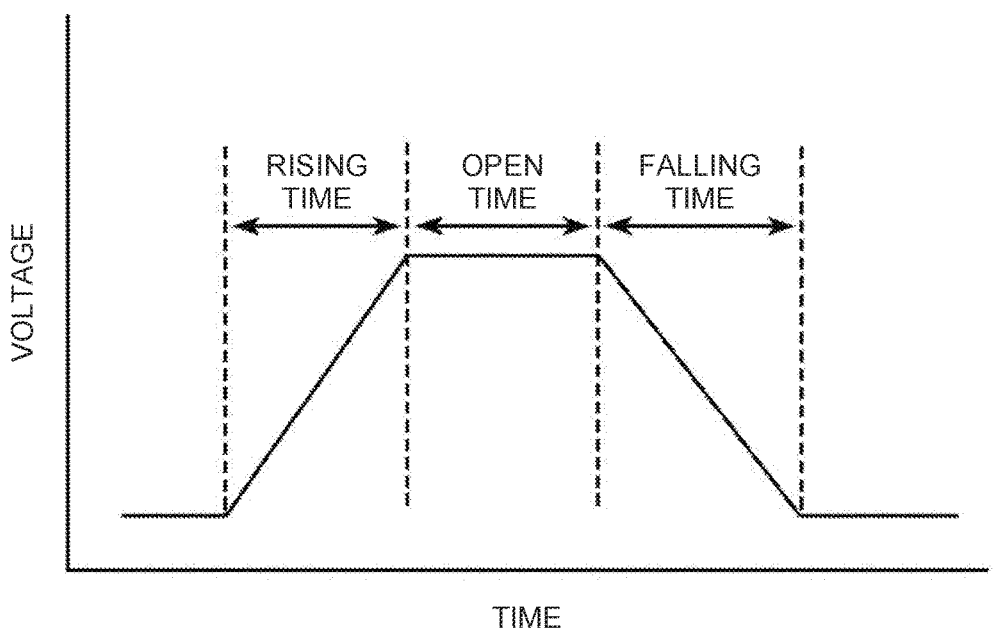
FIG. 17 is a view schematically showing one example of a driving waveform for a dispenser.
Figure 18:
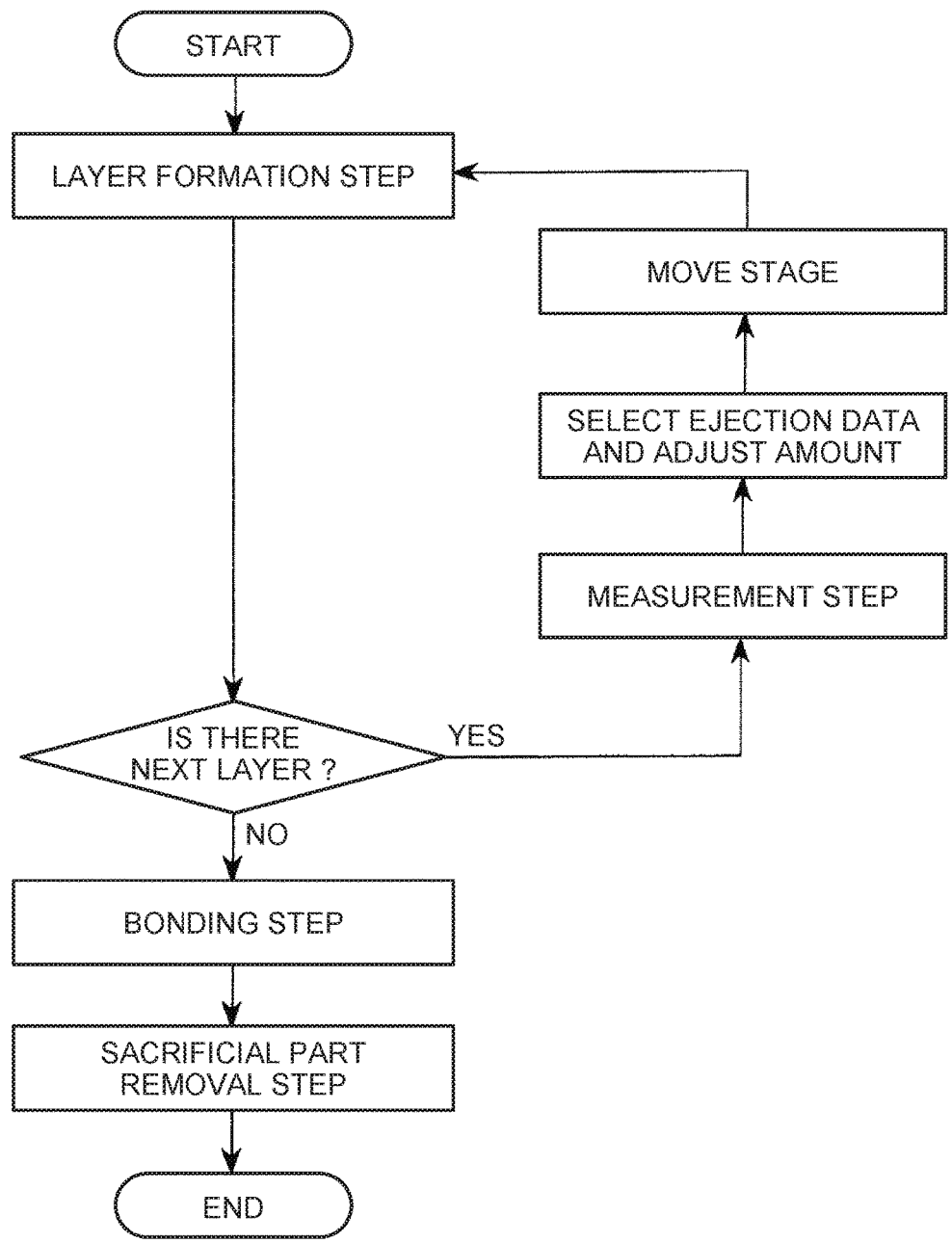
FIG. 18 is a flowchart showing one example of a three-dimensional shaped article production method according to the invention.

FIGS. 1 to 3 and 5 to 12 are each a vertical cross-sectional view schematically showing a step of a preferred embodiment of a three-dimensional shaped article production method according to the invention. FIG. 4 is an enlarged view showing a state of a composition (actual body part forming composition) to be ejected. FIG. 13 is a view showing a region for which the information of the height is to be obtained in the measurement step for determining the ejection amount of a sacrificial part forming composition onto a second portion of an n-th layer in an exaggerated manner with a bold line. FIG. 14 is a view showing a portion which is a portion where a second portion of an (n+1)th layer is to be formed in the second portion of the n-th layer, and overlaps a portion where a first portion of an (n+2)th layer is to be formed when the layer is viewed in a plan view in an exaggerated manner with a bold line. FIG. 15 is a view showing a portion where a first portion of the (n+1)th layer is to be formed in the second portion of the n-th layer in an exaggerated manner with a bold line. FIG. 16 is a view showing a first portion of the n-th layer in an exaggerated manner with a bold line. FIG. 17 is a view schematically showing one example of a driving waveform for a dispenser. FIG. 18 is a flowchart showing one example of a three-dimensional shaped article production method according to the invention.

The three-dimensional shaped article production method according to this embodiment is a method for producing a three-dimensional shaped article 10 by stacking a plurality of layers 1, and includes a layer formation step of forming each layer 1 in a predetermined pattern by ejecting an actual body part forming composition 2' (a composition 2' containing first particles 21 and a first solvent) and a sacrificial part forming composition 5' (a composition 5' containing second particles and a second solvent) as compositions containing particles and a solvent using dispensers M2 and M3, a measurement step of determining the height of the layer 1, and a bonding step of subjecting a stacked body 50 including a plurality of layers 1 to a bonding treatment for bonding the particles (particularly, the first particles 21 constituting the composition 2').

Figure 10:
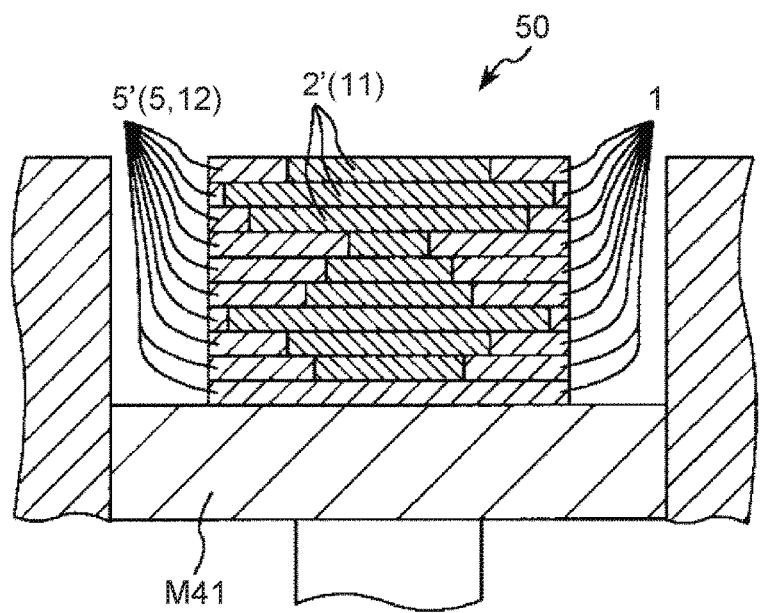
FIG. 10 is a vertical cross-sectional view schematically showing a step of a preferred embodiment of a three-dimensional shaped article production method according to the invention.
Figure 11:
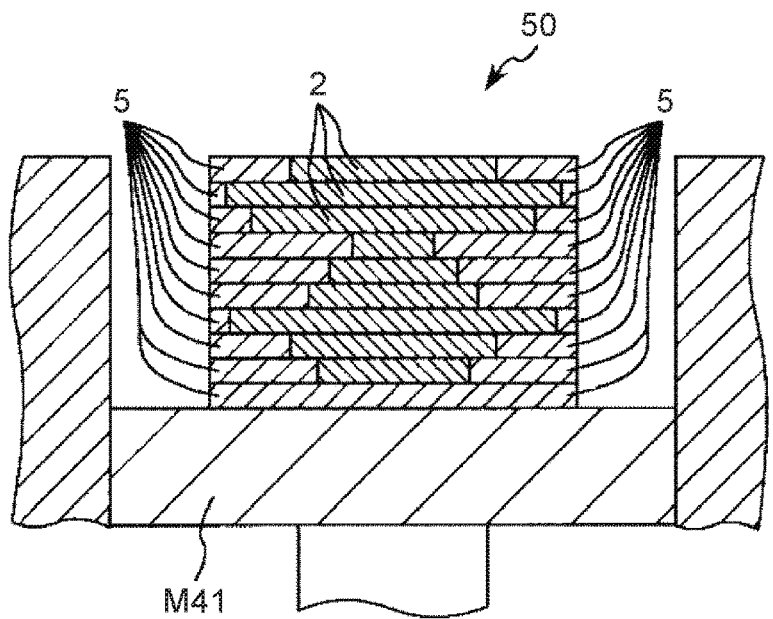
FIG. 11 is a vertical cross-sectional view schematically showing a step (bonding step) of a preferred embodiment of a three-dimensional shaped article production method according to the invention.
Figure 12:
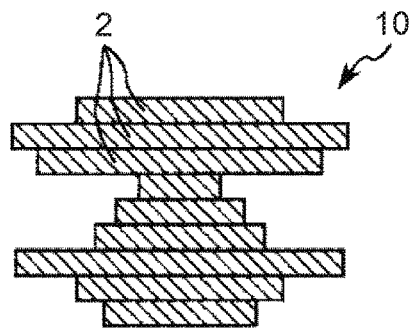
FIG. 12 is a vertical cross-sectional view schematically showing a step (sacrificial part removal step) of a preferred embodiment of a three-dimensional shaped article production method according to the invention.

At least some of the layers 1 constituting the stacked body 50 have a first portion 11 and a second portion 12 (in the configuration shown in FIG. 10, all the layers 1 except for the first layer which is the lowermost layer among the layers 1 constituting the stacked body 50 have the first portion 11 and the second portion 12). The first portion 11 corresponds to a portion to become an actual body part (bonded part) 2 of a three-dimensional shaped article 10 to be formed using the actual body part forming composition 2' containing the first particles 21 and the first solvent, and the second portion 12 corresponds to a portion to become a sacrificial part 5 (a sacrificial part (support part) 5 having a function to support the portion to become the actual body part 2 of the three-dimensional shaped article 10 in a process for producing the three-dimensional shaped article 10) to be formed using the sacrificial part forming composition 5' containing the second particles and the second solvent.

Further, in the case where when n represents an arbitrary integer of 1 or more, the layer 1 in the n-th position (hereinafter referred to as "n-th layer") has the second portion 12, and the second portion 12 of the layer 1 in the (n+1)th position (hereinafter referred to as "(n+1)th layer") is formed in at least part of the surface of the second portion 12 of the n-th layer, the supply amount of the sacrificial part forming composition 5' per unit area to be ejected onto the second portion 12 of the n-th layer from the dispenser M3 in the layer formation step of forming the (n+1)th layer is adjusted based on the information of the height of the surface of the second portion 12 of the n-th layer (for example, in the configuration shown in FIG. 13, the information of the height in a region shown with a bold line).

In this manner, by ejecting the composition using the dispenser, even a composition having a high viscosity can be favorably ejected, and the composition can be effectively prevented from dripping or the like after the composition comes into contact with a target portion. As a result, the dimensional accuracy of the finally obtained three-dimensional shaped article 10 can be enhanced. Further, by using a composition having a high viscosity, the layer 1 having a relatively large thickness can be easily formed, and thus, the productivity of the three-dimensional shaped article 10 can be increased.

Further, by forming the second portion 12 (sacrificial part 5) using the sacrificial part forming composition 5', in the case where a plurality of layers 1 are stacked, even when at least part of the portion corresponding to the actual body part 2 of the three-dimensional shaped article 10 of the layer 1 to be newly formed does not come into contact with the portion corresponding to the actual body part 2 of the three-dimensional shaped article 10 in the previously formed layer 1, the portion of the layer 1 to be newly formed (that is, the portion which does not come into contact with the portion corresponding to the actual body part 2 of the three-dimensional shaped article 10 in the previously formed layer 1) can be favorably supported. In view of this, the three-dimensional shaped article 10 having various shapes can be produced with high dimensional accuracy.

Further, by adjusting the thickness of the layer 1 by adjusting the ejection amount of the composition, the dimensional accuracy of the finally obtained three-dimensional shaped article 10 can be enhanced. More specifically, by adjusting the supply amount of the sacrificial part forming composition 5' per unit area to be ejected onto the second portion 12 of the n-th layer based on the information of the height of the surface of the second portion 12 of the n-th layer, also the shape of the first portion 11 to be supported by the second portion 12 (sacrificial part 5) can be favorably controlled, and thus, the dimensional accuracy of the finally obtained three-dimensional shaped article 10 can be enhanced.

In addition, the surface shape of the first portion 11 to be supported by the second portion 12 (sacrificial part 5) can be favorably controlled, and as a result, also the surface shape of the actual body part 2 of the finally obtained three-dimensional shaped article 10 can be favorably controlled. More specifically, the surface shape of the actual body part 2 of the three-dimensional shaped article 10 can be favorably controlled such that the surface has high smoothness, the surface has minute irregularities such as a textured pattern or a streaked pattern, or the like.

The surface shape of the three-dimensional shaped article 10 has a great influence on the appearance of the entire three-dimensional shaped article 10, and therefore, the reality, texture, aesthetic property, and the like of the finally obtained three-dimensional shaped article 10 can be enhanced.

Further, by adjusting the thickness with the (n+1)th layer while allowing the deviation of the thickness in the n-th layer, the productivity of the three-dimensional shaped article 10 can be particularly increased.

That is, in the case where a deviation of the thickness occurs (in other words, in the case where the thickness of the layer is smaller than a desired value) in each layer constituting the three-dimensional shaped article, it is considered that the composition is additionally supplied when forming the layer so that the thickness of the layer becomes a predetermined value, however, in such a method, the productivity of the three-dimensional shaped article is remarkably decreased. Further, such a method can be applied to a case where the thickness of the layer is smaller than a desired value, but cannot be applied to a case where the thickness of the layer is larger than a desired value.

On the other hand, as in this embodiment, by adjusting the thickness with the (n+1)th layer while allowing the deviation of the thickness in the n-th layer (in other words, by adjusting the ejection amount of the composition per unit area onto the n-th layer (hereinafter also simply referred to as "the supply amount of the composition"), the dimensional accuracy of the three-dimensional shaped article 10 can be sufficiently enhanced, and also the productivity of the three-dimensional shaped article 10 can be increased. Further, the method according to this embodiment can be applied not only to the case where the thickness of the n-th layer is smaller than a desired value, but also to the case where it is larger than a desired value.

Incidentally, a portion in which the height of the n-th layer is measured in the measurement step may be the entire region shown with a bold line in FIG. 13 or may be part of the region shown with a bold line in FIG. 13.

Further, in the invention, it is only necessary to perform the measurement and the adjustment of the ejection amount of the composition as described above when at least one set of adjacent two layers are formed among the layers constituting the stacked body to be formed in the production of the three-dimensional shaped article, and it is not necessary to perform the measurement and the adjustment of the ejection amount of the composition as described above for all combinations of adjacent two layers constituting the stacked body. However, it is preferred to perform the measurement and the adjustment of the ejection amount of the composition as described above for at least a plurality of combinations (in other words, a plurality of n), and it is more preferred to perform the measurement and the adjustment of the ejection amount of the composition as described above for combinations of all layers (in other words, in the case where the stacked body is obtained by stacking m (m is a positive integer) layers, (m−1) combinations of layers.

According to this, the effect as described above is more remarkably exhibited.

In this embodiment, the height of the layer 1 in the case where n is an integer of 2 or more (the height of the n-th layer) refers to a height corresponding to a thickness obtained by accumulating the thicknesses of the respective layers from the first layer to the n-th layer, and does not refer to the thickness of the n-th layer alone.

Hereinafter, the respective steps will be described in detail.

Layer Formation Step

In the layer formation step, the layer 1 is formed in a predetermined pattern by ejecting a composition containing particles using a dispenser.

As the composition, an actual body part forming composition 2' containing first particles 21 and a first solvent (a first solvent as a dispersion medium 22 for dispersing the first particles (dispersoids) 21) and a sacrificial part forming composition 5' containing second particles and a second solvent (a second solvent as a dispersion medium for dispersing the second particles (dispersoids)) are used.

The ejection of the actual body part forming composition (composition) 2' is performed using a dispenser M2, and the ejection of the sacrificial part forming composition (composition) 5' is performed using a dispenser M3.

The actual body part forming composition 2' is ejected onto a first portion 11 corresponding to a portion to become an actual body part 2 of a three-dimensional shaped article 10, and the sacrificial part forming composition 5' is ejected onto a second portion 12 corresponding to a portion to become a sacrificial part 5. The sacrificial part (support part) 5 has a function to support the portion to become the actual body part 2 of the three-dimensional shaped article 10.

In the configuration shown in the drawings, among all layers 1 (all layers 1 constituting a stacked body 50) to be formed in the production of the three-dimensional shaped article 10, the first layer is constituted by only the second portion 12, and the other layers 1 include both of the first portion 11 and the second portion 12. However, some of the layers 1 constituting the stacked body 50 may be constituted by only the first portion 11.

In the layer formation step of forming the layer 1 of the first layer, the composition (composition 5') is ejected onto the surface of a stage (support) M41, and in the layer formation step of forming the layer 1 of the second layer or thereafter, the compositions (composition 2' and composition 5') are ejected onto the previously formed layer 1. That is, in the layer formation step of forming the layer 1 of the first layer, the stage M41 serves as an adherend of the composition (composition 5'), and in the layer formation step of forming the layer 1 of the second layer or thereafter, the previously formed layer 1 serves as an adherend of the compositions (composition 2' and composition 5'). Incidentally, a metal plate (not shown) is placed on the stage M41, and the metal plate may be used as an adherend.

In this embodiment, the layer 1 of the first layer (the layer 1 to come into contact with the stage M41) is constituted by only the second portion 12, and is formed as a layer which does not have the first portion 11.

According to this, the layer 1 of the first layer can be made to function as a sacrificial layer, and can effectively prevent a post-treatment from becoming difficult due to firm bonding of the three-dimensional shaped article 10 to be produced to the stage M41. Further, the dimensional accuracy of the three-dimensional shaped article 10 can be further enhanced.

The composition 2' and the composition 5' may be any as long as they have fluidity to such an extent that they can be ejected, and may be, for example, in the form of a paste.

The viscosity of the composition 2' and the composition 5' in this step is preferably 10 mPa·s or more and 20000 mPa·s or less, more preferably 100 mPa·s or more and 10000 mPa·s or less.

According to this, the ejection stability of the composition 2' and the composition 5' can be further increased, and also the compositions are suitable for forming the layer 1 having a moderate thickness, and can further increase the productivity of the three-dimensional shaped article 10. Further, the excessive wet spreading of the composition 2' and the composition 5' coming into contact with the adherend is effectively prevented, and thus, the dimensional accuracy of the finally obtained three-dimensional shaped article 10 can be further enhanced.

Incidentally, unless otherwise specified, the "viscosity" as used herein refers to a value measured using a rheometer under the condition that the shear rate is $10 \text{ s}^{-1}$.

In this step, it is preferred that each of the composition 2' and the composition 5' is ejected in the form of a plurality of liquid droplets.

According to this, the composition can also be favorably applied to the production of the three-dimensional shaped article 10 having, for example, a fine structure, and the dimensional accuracy of the three-dimensional shaped article 10 can be further enhanced.

In the case where the composition 2' or the composition 5' is ejected in the form of a plurality of liquid droplets in this step, the volume per droplet of the liquid droplet to be ejected is preferably 1 pL or more and 500 pL or less, more preferably 2 pL or more and 300 pL or less.

According to this, the composition can also be favorably applied to the production of the three-dimensional shaped article 10 having, for example, a fine structure, and the dimensional accuracy of the three-dimensional shaped article 10 can be further enhanced, and also the productivity of the three-dimensional shaped article 10 can be further increased.

In the production of the three-dimensional shaped article 10, a plurality of types of compositions 2' may be used.

According to this, for example, materials can be combined according to the properties required for the respective portions of the three-dimensional shaped article 10, and therefore, the properties (including appearance, functionality (such as elasticity, toughness, heat resistance, and corrosion resistance), etc.) of the three-dimensional shaped article 10 as a whole can be further enhanced.

Further, in the production of the three-dimensional shaped article 10, a plurality of types of compositions 5' may be used.

The actual body part forming composition 2' and the sacrificial part forming composition 5' will be described in detail later.

In the production of the three-dimensional shaped article 10, the layer formation step is performed only a predetermined number of times, and the stacked body 50 in which a plurality of layers 1 are stacked is obtained.

That is, it is determined whether or not a new layer 1 should be formed on the previously formed layer 1, and in the case where there is a layer 1 which should be formed, a new layer 1 is formed, and in the case where there is no layer 1 which should be formed, a bonding step which will be described in detail later is performed for the stacked body 50.

In the layer formation step of forming an (n+1)th layer (that is, the layer formation step of forming the layer 1 of the second layer or thereafter), the supply amount of the composition 5' per unit area to be ejected onto the second portion 12 of the n-th layer from the dispenser M3 is adjusted based on the information of the height of the n-th layer which is the previously formed layer 1 (in particular, the information of the height of the second portion 12 of the n-th layer) determined in a measurement step which will be described in detail later.

The adjustment of the supply amount of the composition 5' may be performed by any method, but can be performed by, for example, adjusting the number of liquid droplets of the composition 5' to be ejected from the dispenser M3. That is, the supply amount of the sacrificial part forming composition 5' per unit area to be ejected onto the second portion 12 of the n-th layer can be adjusted by adjusting the number of liquid droplets of the sacrificial part forming composition 5' per unit area to be ejected onto the n-th layer from the dispenser M3.

According to this, the supply amount of the composition 5' can be easily and simply adjusted. In particular, it is not necessary to prepare a plurality of pieces of driving waveform data for the dispenser M3 in advance, and this can be favorably applied to the ejection of various types of compositions.

In the layer formation step of forming the n-th layer, a predetermined number (which is a predetermined value) of liquid droplets per unit area of the sacrificial part forming composition 5' are applied, and in the layer formation step of forming the (n+1)th layer, it is preferred that the ejection amount of the sacrificial part forming composition 5' per unit area is adjusted by selecting at least one of a value smaller than the predetermined value and a value larger than the predetermined value as the number of liquid droplets per unit area of the sacrificial part forming composition 5'.

According to this, in both cases where the height of the n-th layer is smaller than a desired value and where the height of the n-th layer is larger than a desired value, the ejection amount of the composition 5' (in other words, the thickness of the (n+1)th layer) in the layer formation step of forming the (n+1)th layer can be favorably adjusted. More specifically, in the case where the height of the n-th layer is lower than a target value, the number of liquid droplets of the composition 5' is set to be larger than the predetermined value, and in the case where the height of the n-th layer is higher than a target value, the number of liquid droplets of the composition 5' is set to be smaller than the predetermined value. By doing this, the height after forming the (n+1)th layer can be favorably adjusted. As a result, the dimensional accuracy of the three-dimensional shaped article 10 can be further enhanced.

The thickness of the layer 1 (the thickness of the n-th layer) to be formed by setting the number of liquid droplets per unit area of the composition 5' to a predetermined value is not particularly limited, but is preferably 10 μm or more and 500 μm or less, more preferably 20 μm or more and 250 μm or less.

According to this, the dimensional accuracy of the three-dimensional shaped article 10 can be further enhanced while increasing the productivity of the three-dimensional shaped article 10.

In the layer formation step of forming the (n+1)th layer, in the case where a value smaller than the predetermined value (the number of liquid droplets per unit area of the composition 5' when forming the n-th layer) is adopted as the number of liquid droplets per unit area of the composition 5', the ejection amount of the composition 5' per unit area in the portion of the (n+1)th layer is not particularly limited, but is preferably 10% or more and 90% or less, more preferably 20% or more and 80% or less with respect to the ejection amount of the composition 5' per unit area in the n-th layer.

According to this, both productivity and dimensional accuracy of the three-dimensional shaped article 10 can be achieved at a higher level.

In the layer formation step of forming the (n+1)th layer, in the case where a value larger than the predetermined value (the number of liquid droplets per unit area of the composition 5' when forming the n-th layer) is adopted as the number of liquid droplets per unit area of the composition 5', the ejection amount of the composition 5' per unit area in the portion of the (n+1)th layer is not particularly limited, but is preferably 110% or more and 190% or less, more preferably 120% or more and 180% or less with respect to the ejection amount of the composition 5' per unit area in the n-th layer.

According to this, both productivity and dimensional accuracy of the three-dimensional shaped article 10 can be achieved at a higher level.

The adjustment of the supply amount of the composition 5' may be performed by selecting driving waveform data for the dispenser M3 when the composition 5' is ejected from a data group including a plurality of pieces of driving waveform data. That is, the supply amount of the sacrificial part forming composition 5' per unit area to be ejected onto the second portion 12 of the n-th layer can be adjusted by selecting waveform data when the sacrificial part forming composition 5' is ejected from the dispenser M3 from a data group including a plurality of pieces of waveform data.

According to this, even if it is necessary to change the ejection amount of the composition 5', the composition 5' can be ejected at a high frequency, and thus, the productivity of the three-dimensional shaped article 10 can be increased.

As shown in the drawing, the driving waveform for the dispenser generally includes a rising part in which a pulsed DC voltage rises, an open part in which the voltage becomes constant, and a falling part in which the voltage falls. By adjusting times in these parts (a rising time, an open time, and a falling time) or the maximum voltage, or the like, the driving waveform for the dispenser can be adjusted.

The data group can include a plurality of pieces of data (driving waveform data) in which at least one of these conditions is mutually different.

Further, it is preferred that the data group includes reference driving waveform data for a predetermined ejection amount, driving waveform data for a decreased amount such that the ejection amount is smaller than that in the case of using the reference driving waveform data, and driving waveform data for an increased amount such that the ejection amount is larger than that in the case of using the reference driving waveform data.

According to this, for example, in the layer formation step of forming the n-th layer, the reference driving waveform data is used, and in the layer formation step of forming the (n+1)th layer, the ejection amount of the composition 5' per unit area can be adjusted using at least one of the driving waveform data for a decreased amount and the driving waveform data for an increased amount, and therefore, the ejection amount of the composition 5' (in other words, the thickness of the (n+1)th layer) in the layer formation step of forming the (n+1)th layer can be favorably adjusted in both cases where the height of the n-th layer is smaller than a desired value and where the height of the n-th layer is larger than a desired value. More specifically, in the case where the height of the n-th layer is lower than a target value, the driving waveform data for an increased amount is used, and in the case where the height of the n-th layer is higher than a target value, the driving waveform data for a decreased amount is used. By doing this, the height after forming the (n+1)th layer can be favorably adjusted. As a result, the dimensional accuracy of the three-dimensional shaped article 10 can be further enhanced.

The thickness of the layer 1 to be formed using the reference driving waveform data is not particularly limited, but is preferably 10 μm or more and 500 μm or less, more preferably 20 μm or more and 250 μm or less.

According to this, the dimensional accuracy of the three-dimensional shaped article 10 can be further enhanced while increasing the productivity of the three-dimensional shaped article 10.

The ejection amount of the composition 5' per unit area when using the driving waveform data for a decreased amount is not particularly limited, but is preferably 10% or more and 90% or less, more preferably 20% or more and 80% or less with respect to the ejection amount of the composition 5' per unit area when using the reference driving waveform data.

According to this, both productivity and dimensional accuracy of the three-dimensional shaped article 10 can be achieved at a higher level.

The ejection amount of the composition 5' per unit area when using the driving waveform data for an increased amount is not particularly limited, but is preferably 110% or more and 190% or less, more preferably 120% or more and 180% or less with respect to the ejection amount of the composition 5' per unit area when using the reference driving waveform data.

According to this, both productivity and dimensional accuracy of the three-dimensional shaped article 10 can be achieved at a higher level.

The data group may include a plurality of pieces of driving waveform data with respect to, for example at least one of the driving waveform data for a decreased amount and the driving waveform data for an increased amount. For example, the data group may include a plurality of pieces of driving waveform data for a decreased amount, or may include a plurality of pieces of driving waveform data for an increased amount, or may include a plurality of pieces of driving waveform data for a decreased amount and a plurality of pieces of driving waveform data for an increased amount.

According to this, the dimensional accuracy of the three-dimensional shaped article 10 can be further enhanced.

Further, in the formation of one layer 1, a plurality of pieces of driving waveform data (for example, at least one piece of driving waveform data for a decreased amount and at least one piece of driving waveform data for an increased amount) may be used.

According to this, the height of the layer 1 in the respective portions can be more favorably adjusted, and thus, the dimensional accuracy of the three-dimensional shaped article 10 can be further enhanced.

In the measurement step which will be described in detail later, the height of the layer 1 may be determined at least in a region where the second portion 12 of the (n+1)th layer is to be formed in the second portion 12 of the n-th layer (see FIG. 13), and in this step (layer formation step), at least the supply amount of the composition 5' in the region (a region where the second portion 12 of the (n+1)th layer is to be formed in the second portion 12 of the n-th layer) may be adjusted based on the measurement result. However, the supply amount of the composition 2' and the supply amount of the composition 5' in the other region of the n-th layer (a region other than "the region where the second portion 12 of the (n+1)th layer is to be formed in the second portion 12 of the n-th layer", for example, a region shown with a bold line in FIGS. 15 and 16) may be adjusted. According to this, the dimensional accuracy of the three-dimensional shaped article 10 can be further enhanced.

The measurement of the height in the other region of the n-th layer will be described in detail later.

Measurement Step

After the layer formation step, the height of the layer 1 formed in the layer formation step is determined.

The information of the height of the layer 1 (n-th layer) measured in this step is utilized for the adjustment of the ejection amount of the composition (composition 2' or composition 5') per unit area when the layer 1 ((n+1)th layer) is newly formed on the surface of the layer 1.

The measurement of the height of the layer 1 may be performed by any method, but can be performed using, for example, a laser displacement meter.

According to this, the height of the layer 1 can be determined with high accuracy using a relatively inexpensive device. Incidentally, the arrows in FIGS. 2, 6, and 9 indicate light (laser light) L for measurement.

In this step (measurement step), the height of the layer 1 may be determined in the region where the second portion 12 of the (n+1)th layer is to be formed in the second portion 12 of the n-th layer (see FIG. 13), however, it is particularly preferred to measure the height of the surface of a portion which is a portion where the second portion 12 of the (n+1)th layer is to be formed in the second portion 12 of the n-th layer, and overlaps a portion where the first portion 11 of the layer 1 in the (n+2)th position (hereinafter referred to as "(n+2)th layer") is to be formed when the layer 1 is viewed in a plan view (see FIG. 14).

According to this, the dimensional accuracy of the three-dimensional shaped article 10 can be further enhanced.

In this step (measurement step), it is only necessary to determine the height of the layer 1 in the region where the second portion 12 of the (n+1)th layer is to be formed in the second portion 12 of the n-th layer (see FIG. 13), however, the height of the layer 1 in the other region of the n-th layer (a region other than "the region where the second portion 12 of the (n+1)th layer is to be formed in the second portion 12 of the n-th layer") may be measured.

For example, the height of the surface in a portion where the first portion 11 of the (n+1)th layer is to be formed in the second portion 12 of the n-th layer (see FIG. 15) may also be measured.

According to this, the dimensional accuracy of the three-dimensional shaped article 10 can be further enhanced.

In this manner, in the case where the height of the surface in a portion where the first portion 11 of the (n+1)th layer is to be formed in the second portion 12 of the n-th layer is measured, the measurement result is utilized for the adjustment of the supply amount of the composition 2' (the supply amount of the composition 2' from the dispenser M2) in the layer formation step of forming the (n+1)th layer.

Further, in the measurement step, the height of the surface in the first portion 11 of the n-th layer (see FIG. 16) in addition to the second portion 12 of the n-th layer may also be measured.

According to this, the dimensional accuracy of the three-dimensional shaped article 10 can be further enhanced.

In this manner, in the case where the height of the surface in the first portion 11 of the n-th layer is measured, the measurement result is utilized for the adjustment of the supply amount of at least one of the composition 2' and the composition 5' (the supply amount of the composition from at least one of the dispenser M2 and the dispenser M3) in the layer formation step of forming the (n+1)th layer.

In the layer formation step of forming the (n+1)th layer, in the case where the adjustment of the supply amount of the composition 2' is performed, as the method for the adjustment of the supply amount of the composition 2', the same method and conditions as described for the composition 5' in the item of "Layer Formation Step" can be adopted. According to this, the same effect as described above is obtained.

In the measurement step, it is only necessary to determine the height in at least one place of the portion where the (n+1)th layer is to be stacked in the surface of the n-th layer, however, it is preferred that the height is determined in a plurality of places to come into contact with the (n+1)th layer and the ejection amount of the composition per unit area in the layer formation step of forming the (n+1)th layer is adjusted so that the film thickness becomes a desired value with the n-th layer and the (n+1)th layer.

According to this, the height of the layer 1 in the respective portions can be individually adjusted, and thus, the dimensional accuracy of the three-dimensional shaped article 10 can be further enhanced.

The number of places where the height of the n-th layer is measured varies depending on the area of the n-th layer (the area of a region where the (n+1)th layer is to be stacked in the n-th layer) or the like, but is preferably 2 places or more and 1000 places or less, more preferably 3 places or more and 500 places or less.

According to this, both productivity and dimensional accuracy of the three-dimensional shaped article 10 can be achieved at a higher level.

Further, the number of measurement places per unit area of the region where the second portion 12 of the (n+1)th layer is to be formed in the second portion 12 of the n-th layer is preferably 0.01 places/cm$^2$ or more and 3.0 places/cm$^2$ or less, more preferably 0.05 places/cm$^2$ or more and 1.0 places/cm$^2$ or less.

According to this, both productivity and dimensional accuracy of the three-dimensional shaped article 10 can be achieved at a higher level.

As described above, the compositions 2' and 5' to be ejected from the dispensers M2 and M3 contain a solvent.

The removal of the solvent (first solvent or second solvent) from the composition (composition 2' or composition 5') ejected from the dispenser (dispenser M2 or M3) may be performed at any timing, but is preferably performed before performing the measurement step for the layer 1 formed using the composition. In other words, it is preferred to perform the measurement step for the n-th layer after performing a solvent removal step of removing the solvent from the n-th layer.

According to this, the effect of the deformation (change in the thickness) of the n-th layer after performing the measurement step can be prevented, and the application amount of the composition (composition 2' or composition 5') in the layer formation step of forming the (n+1)th layer can be more appropriately determined. As a result, the dimensional accuracy of the three-dimensional shaped article 10 can be further enhanced.

The removal of the solvent from the ejected composition (composition 2' or composition 5') can be performed by, for example, a heating treatment or a depressurization treatment.

The solvent removal step may be performed before the composition (composition 2' or composition 5') comes into contact with a target portion, or may be performed after the composition (composition 2' or composition 5') comes into contact with a target portion.

It is determined whether or not a new layer should be formed on the upper surface of the layer 1, and in the case where there is a next layer which should be formed, the stage M41 is moved, and a series of steps as described above (that is, a series of steps including the layer formation step and the measurement step) are performed.

Bonding Step

After a stacked body 50 in which a predetermined number of layers 1 are stacked is obtained by repeatedly performing the above-mentioned steps (see FIG. 10), the stacked body 50 is subjected to a bonding treatment for bonding the first particles 21 contained in the composition 2'. In other words, in the case where there is no next layer which should be formed after repeatedly performing a series of steps as described above, the obtained stacked body 50 is subjected to a bonding treatment for bonding the first particles 21 contained in the composition 2'.

According to this, the first particles 21 contained in the composition 2' are bonded to each other, whereby a bonded part 2 is formed. By forming the bonded part 2 in this manner, the actual body part (bonded part 2) of the three-dimensional shaped article 10 is configured such that the first particles 21 are firmly bonded to each other, and therefore, undesirable deformation or the like of the three-dimensional shaped article 10 in a sacrificial part removal step as a post-treatment to be performed thereafter is effectively prevented, and the dimensional accuracy, mechanical strength, and the like of the finally obtained three-dimensional shaped article 10 can be enhanced.

The bonding step may be performed by any method as long as the method is performed for the stacked body 50 including a plurality of layers 1, but is generally performed by a heating treatment.

The heating in the bonding step (sintering step) is preferably performed at a temperature higher than the melting point of the constituent material of the first particles 21 (in the case where the first particles 21 contain a plurality of components, the melting point of a component whose content is the highest).

According to this, the bonding of the first particles 21 can be more efficiently performed.

When the melting point of the constituent material of the first particles 21 is represented by Tm (° C.), the heating temperature in the bonding step is preferably (Tm+1°) C. or higher and (Tm+80°) C. or lower, more preferably (Tm+5°) C. or higher and (Tm+60°) C. or lower.

According to this, the bonding of the first particles 21 can be more efficiently performed by a heating treatment in a shorter time, and also undesirable deformation of the stacked body 50 during the bonding step can be more effectively prevented, and thus, the dimensional accuracy of the three-dimensional shaped article 10 can be further enhanced.

In the case where the first particles 21 contain a plurality of components, the melting point of a component whose content is the highest can be adopted as the melting point.

The heating time in the bonding step is not particularly limited, but is preferably 30 seconds or more and 60 minutes or less, more preferably 1 minute or more and 30 minutes or less.

According to this, undesirable deformation in this step can be more effectively prevented while allowing the bonding of the first particles 21 to proceed sufficiently, and thus, both mechanical strength and dimensional accuracy of the three-dimensional shaped article 10 can be achieved at a higher level, and also the productivity of the three-dimensional shaped article 10 can be further increased.

Further, in this step, the bonding of the second particles contained in the sacrificial part forming composition 5' may be performed.

In the case where the bonding of the second particles constituting the sacrificial part forming composition 5' is performed in this step, the bonding of the second particles may be performed such that the bonding strength (for example, the sintering degree) between the second particles is smaller than the bonding strength (for example, the sintering degree) between the first particles 21 constituting the composition 2'.

According to this, while effectively exhibiting the function as the sacrificial part 5, the removal of the sacrificial part 5 in the below-mentioned sacrificial part removal step can be more easily performed.

Sacrificial Part (Support Part) Removal Step

After performing the bonding step, the sacrificial part 5 is removed as a post-treatment step. By doing this, the three-dimensional shaped article 10 is taken out.

Examples of a specific method of this step include a method in which the sacrificial part 5 is removed by brushing with a brush or the like, a method in which the sacrificial part 5 is removed by suction, a method in which a gas such as air is blown thereto, a method in which a liquid such as water is applied thereto (for example, a method in which a complex of the sacrificial part 5 and the three-dimensional shaped article 10 obtained as described above is soaked in a liquid, a method in which a liquid is sprayed thereto, etc.), a method in which vibration such as ultrasonic vibration is applied thereto, and a method in which the sacrificial part 5 formed by bonding the second particles is destroyed by smashing or the like. Further, two or more methods selected from these methods can be performed in combination.

In addition, for example, a method in which the sacrificial part 5 is removed by using a liquid capable of dissolving at least a portion of the sacrificial part 5, or a method in which the sacrificial part 5 is removed by decomposition through a chemical reaction may be adopted.

According to the production method according to the invention as described above, a three-dimensional shaped article having high dimensional accuracy can be efficiently produced.

The three-dimensional shaped article production method as described above is summarized in a flowchart as shown in FIG. 18.

Incidentally, in the configuration shown in the drawings, a case where the above-mentioned respective steps are performed sequentially is described for facilitating the understanding, however, different steps may be performed simultaneously in the respective portions in a shaping region (that is, a space on the stage). For example, in different regions in a shaping region, the layer formation step and the measurement step may be performed simultaneously. Further, for example, in different regions in a shaping region, the layer formation step for the n-th layer and the layer formation step for the (n+1)th layer may be performed simultaneously, or the measurement step for the n-th layer and the measurement step for the (n+1)th layer may be performed simultaneously.

Three-Dimensional Shaped Article Production Apparatus

Next, the three-dimensional shaped article production apparatus according to the invention will be described.

Figure 19:
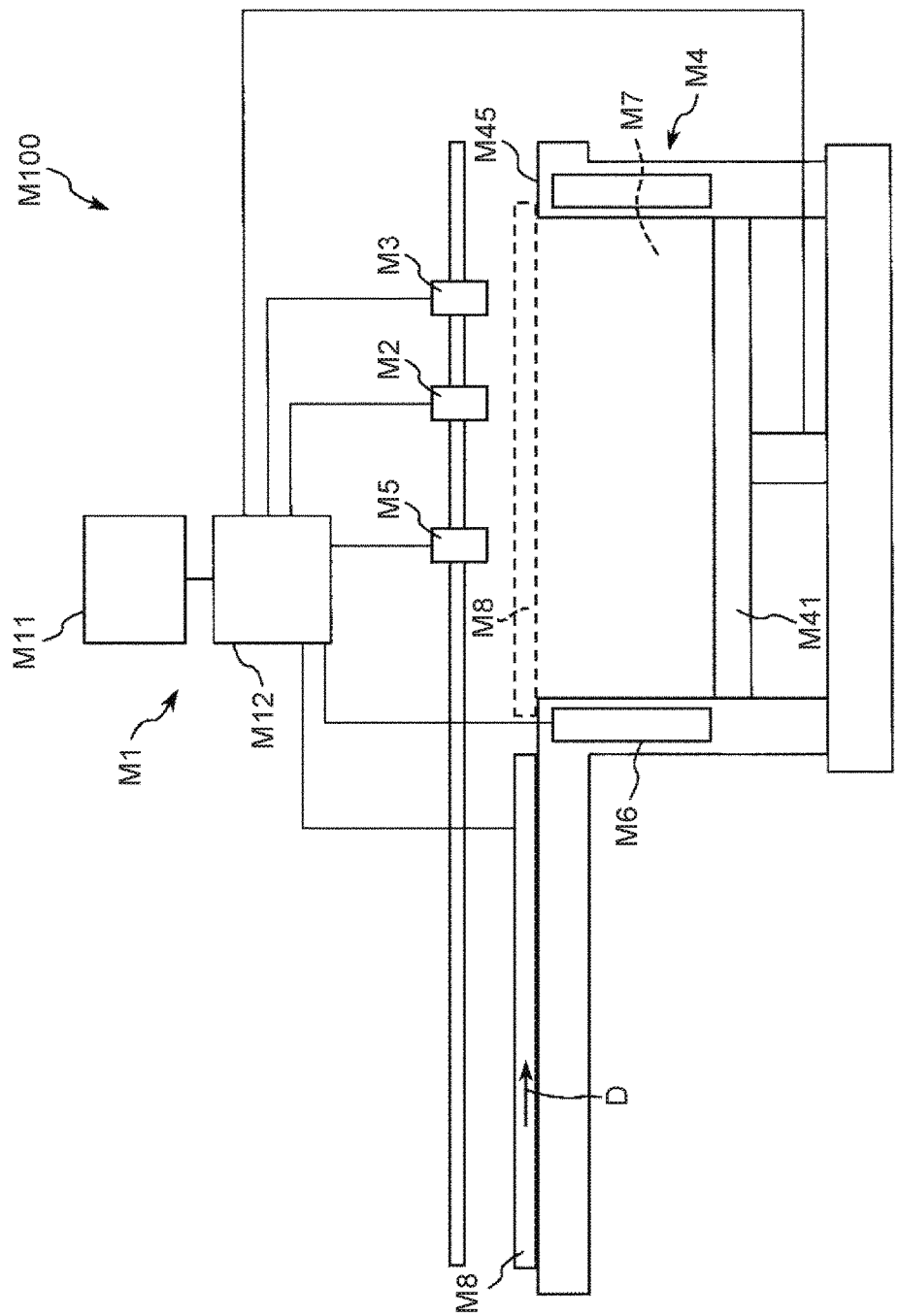
FIG. 19 is a cross-sectional view schematically showing a preferred embodiment of a three-dimensional shaped article production apparatus according to the invention.

FIG. 19 is a cross-sectional view schematically showing a preferred embodiment of the three-dimensional shaped article production apparatus according to the invention.

As shown in the drawing, a three-dimensional shaped article production apparatus M100 includes a control section M1, a dispenser (first dispenser) M2 which ejects a composition (actual body part forming composition) 2' containing first particles 21 and a first solvent, a dispenser (second dispenser) M3 which ejects a composition (sacrificial part forming composition) 5' containing second particles and a second solvent, a measurement unit M5 which determines the height of the surface of a layer 1 formed using the sacrificial part forming composition 5', and a bonding unit M6 which applies energy to a stacked body 50 including a plurality of layers 1 so as to bond the first particles 21 contained in the stacked body 50.

The control section M1 controls the ejection amount or the like of the composition 2' or 5' from the dispenser M2 or M3. More specifically, the control section M1 is configured to adjust the supply amount of the sacrificial part forming composition 5' per unit area to the layer 1 (n-th layer) for which the height of the surface has been measured from the dispenser (second dispenser) M3 based on the result of measurement made by the measurement unit M5 so as to adjust the height of the layer 1 ((n+1)th layer) to be formed on the layer 1 (n-th layer) for which the height has been measured.

According to this, the production method for the three-dimensional shaped article 10 according to the invention as described above can be favorably performed, and the dimensional accuracy of the finally obtained three-dimensional shaped article 10 can be enhanced.

Further, by performing the ejection of the composition (composition 2' or 5') using the dispenser, for example, as compared with the case where the composition is ejected by an inkjet method or the like, the productivity of the three-dimensional shaped article 10 can be particularly increased. In addition, even a composition having a relatively high viscosity can be favorably ejected, and therefore, the range of choice of the material is expanded.

Further, by adjusting the thickness with the (n+1)th layer while allowing the deviation of the thickness in the n-th layer, the productivity of the three-dimensional shaped article 10 can be increased.

The control section M1 may also be configured to, for example, adjust the number of liquid droplets (the number of liquid droplets per unit area) of the composition (composition 2' or 5') to be ejected from the dispenser (dispenser M2 or M3) based on the result of measurement made by the measurement unit M5 so as to adjust the height of the new layer 1 ((n+1)th layer) to be formed on the layer 1 (n-th layer) for which the height has been measured.

According to this, it is not necessary to prepare a plurality of pieces of driving waveform data for the dispenser in advance, and this can be favorably applied to the ejection of various types of compositions.

Further, for example, the control section M1 may also be configured to adjust the ejection amount of the composition 2' or 5' per unit area onto the layer 1 (n-th layer) for which the height has been measured by selecting driving waveform data to be input to the dispenser M2 or M3 from a memory section including a plurality of pieces of driving waveform data based on the result of measurement made by the measurement unit M5 so as to adjust the height of the layer 1 ((n+1)th layer) to be formed on the layer 1 (n-th layer) for which the height has been measured.

According to this, even if it is necessary to change the ejection amount of the composition, the composition can be ejected at a high frequency, and thus, the productivity of the three-dimensional shaped article 10 can be increased.

The memory section may be a part of the control section M1 (more specifically, for example, a part of the below-mentioned computer M11) or may be one (an external memory unit) provided outside the control section M1.

The control section M1 includes a computer M11 and a drive control section M12.

The computer M11 is a common desktop computer or the like configured to include a CPU, a memory, etc. therein. The computer M11 digitizes the shape of a three-dimensional shaped article 10 as model data, and outputs cross-sectional data (slice data) obtained by slicing the three-dimensional shaped article 10 into a plurality of parallel layers of thin cross-sectional bodies to the drive control section M12.

Further, the computer M11 may also be configured to, for example, determine the number of liquid droplets (the number of liquid droplets per unit area) of the composition 2' or 5' to be ejected from the dispenser M2 or M3 based on the result of measurement made by the measurement unit M5 and output the information to the drive control section M12 or select driving waveform data to be input to the dispenser M2 or M3 from the memory section including a plurality of pieces of driving waveform data and output the data to the drive control section M12.

The drive control section M12 functions as a control unit which individually drives the dispenser M2, the dispenser M3, a layer forming section M4, the measurement unit M5, the bonding unit M6, a shutter M8, and the like. Specifically, the drive control section M12 controls, for example, the ejection pattern and the ejection amount of the composition 2' by the dispenser M2, the driving waveform for the dispenser M2, the ejection pattern and the ejection amount of the composition 5' by the dispenser M3, the driving waveform for the dispenser M3, the measurement of the height of the layer 1 by the measurement unit M5 (the setting of a measurement place, the detection of a height, etc.), the on/off of heating by the bonding unit (heating unit) M6, the heating temperature, the lowering amount of a stage (up-and-down stage) M41, the opening and closing of the shutter M8, and the like.

The layer forming section M4 includes the stage (up-and-down stage) M41, to which the composition 2' and the composition 5' are supplied, and which supports the layer 1 constituted by the composition 2' and the composition 5' (sacrificial part 5), and a frame body M45, which surrounds the up-and-down stage M41.

The up-and-down stage M41 is lowered sequentially by a predetermined amount according to the command from the drive control section M12 when a new layer 1 is formed on the previously formed layer 1.

The stage M41 has a flat surface (more specifically, a portion to which the composition 2' and the composition 5' are applied). According to this, the layer 1 having a highly uniform thickness can be easily and reliably formed.

The stage M41 is preferably constituted by a material having a high strength. Examples of the constituent material of the stage M41 include various metal materials such as stainless steel.

Further, the surface of the stage M41 may be subjected to a surface treatment. According to this, for example, the constituent material of the composition 2' or the constituent material of the composition 5' is more effectively prevented from being firmly adhered to the stage M41, or the durability of the stage M41 is made particularly excellent, and thus, the three-dimensional shaped article 10 can be stably produced for a longer period of time. Examples of the material to be used for the surface treatment for the surface of the stage M41 include fluororesins such as polytetrafluoroethylene.

The dispenser M2 is configured to move according to the command from the drive control section M12 and eject the composition 2' onto a desired portion on the stage M41 in a predetermined pattern.

The dispenser M2 is preferably configured to eject the composition 2' as a liquid droplet. According to this, the composition 2' can be applied in a fine pattern, and even if the three-dimensional shaped article 10 has a fine structure, the three-dimensional shaped article 10 can be produced with particularly high dimensional accuracy and particularly high productivity.

The dispenser M2 is configured such that the driving waveform, the pattern of the composition 2' to be applied (the pattern corresponding to the bonded part 2 to be formed), the amount of the composition 2' (for example, the number of liquid droplets or the like per unit area of the composition 2'), and the like are controlled according to the command from the drive control section M12. The driving waveform for the dispenser M2, the ejection pattern, the ejection amount, and the like of the composition 2' by the dispenser M2 are determined based on the slice data, the result of measurement made by the measurement unit M5, or the like. According to this, a necessary and sufficient amount of the composition 2' can be applied, and thus, the bonded part 2 in a desired pattern can be reliably formed, and the dimensional accuracy and the like of the three-dimensional shaped article 10 can be more reliably enhanced.

The dispenser M2 includes one ejection section (nozzle).

The size (nozzle diameter) of the ejection section of the dispenser M2 is not particularly limited, but is preferably 10 μm or more and 100 μm or less.

According to this, while further enhancing the dimensional accuracy of the three-dimensional shaped article 10, the productivity of the three-dimensional shaped article 10 can be further increased.

The dispenser M3 is configured to move according to the command from the drive control section M12 and eject the composition 5' onto a desired portion on the stage M41 in a predetermined pattern.

The dispenser M3 is preferably configured to eject the composition 5' as a liquid droplet. According to this, the composition 5' can be applied in a fine pattern, and even if the three-dimensional shaped article 10 has a fine structure, the three-dimensional shaped article 10 can be produced with particularly high dimensional accuracy and particularly high productivity.

The dispenser M3 is configured such that the driving waveform, the pattern of the composition 5' to be applied (the pattern corresponding to the sacrificial part 5 to be formed), the amount of the composition 5' (for example, the number of liquid droplets or the like per unit area of the composition 5'), and the like are controlled according to the command from the drive control section M12. The driving waveform for the dispenser M3, the ejection pattern, the ejection amount, and the like of the composition 5' by the dispenser M3 are determined based on the slice data or the result of measurement made by the measurement unit M5. According to this, a necessary and sufficient amount of the composition 5' can be applied, and thus, the sacrificial part 5 in a desired pattern can be reliably formed, and the dimensional accuracy and the like of the three-dimensional shaped article 10 can be more reliably enhanced.

The dispenser M3 includes one ejection section (nozzle).

The size (nozzle diameter) of the ejection section of the dispenser M3 is not particularly limited, but is preferably 10 μm or more and 100 μm or less.

According to this, while further enhancing the dimensional accuracy of the three-dimensional shaped article 10, the productivity of the three-dimensional shaped article 10 can be further increased.

The measurement unit M5 determines the height of the layer 1.

The data of measurement made by the measurement unit M5 is sent to the control section M1 and utilized for the adjustment of the ejection amount of the composition 2' or 5' per unit area in the layer formation step of forming the next layer ((n+1)th layer).

In this embodiment, the measurement unit M5 is a laser displacement meter.

The bonding unit M6 applies energy to the stacked body 50 including a plurality of layers 1 so as to bond the first particles 21 contained in the stacked body 50 thereby forming the bonded part 2. That is, the three-dimensional shaped article production apparatus M100 according to this embodiment further includes the bonding unit M6 which applies energy for bonding the first particles 21 to the stacked body 50 in which the layers 1 are stacked.

By including such a bonding unit M6, the three-dimensional shaped article 10 can be produced in the same apparatus without taking the stacked body 50 obtained by stacking a plurality of layers 1 outside the three-dimensional shaped article production apparatus M100, and therefore, the productivity of the three-dimensional shaped article 10 can be further increased.

In the configuration shown in the drawing, the shutter M8 is provided so that the stacked body 50 is placed in an isolation section M7, which is a space isolated from the dispensers M2 and M3, and the like (in other words, a space for isolating the stacked body 50 so as to prevent the dispensers M2 and M3, and the like from being adversely affected by heating by the bonding unit M6) when performing the bonding of the first particles 21 in the stacked body 50.

According to this, the dispensers M2 and M3 can be effectively prevented from being adversely affected by heating (for example, clogging or the like due to the deposition of a solid component of the composition 2' or 5'), and thus, the three-dimensional shaped article 10 can be more stably produced over a long period of time.

Incidentally, the arrow in the drawing indicates the moving direction D of the shutter M8 when the stacked body 50 is isolated from the dispensers M2 and M3, and the like.

According to the three-dimensional shaped article production apparatus according to the invention as described above, a three-dimensional shaped article having high dimensional accuracy can be efficiently produced.

Actual Body Part Forming Composition

Next, the actual body part forming composition (composition) 2' to be used for producing the three-dimensional shaped article 10 will be described.

The composition 2' contains first particles 21 and a first solvent, and is a composition to be used for forming the actual body part 2 of the three-dimensional shaped article 10.

Hereinafter, the constituent components of the composition 2' will be described.

First Particles

The composition 2' contains a plurality of first particles 21.

By including the first particles 21 in the composition (actual body part forming composition) 2', the range of choice of the constituent material of the three-dimensional shaped article 10 can be expanded, and the three-dimensional shaped article 10 having desired physical properties, texture, etc. can be favorably obtained. For example, in the case where the three-dimensional shaped article is produced using a material dissolved in a solvent, there is a limitation on the material which can be used, however, by using the composition 2' containing the first particles 21, such a limitation can be eliminated. Further, for example, the mechanical strength, toughness, durability, and the like of the three-dimensional shaped article 10 can be further increased, and it can be applied not only to trial production, but also to actual products.

Examples of the constituent material of the first particles 21 include metal materials, metal compounds (such as ceramics), resin materials, and pigments.

The composition 2' preferably contains particles constituted by a material containing at least one of a metal material and a ceramic material as the first particles 21.

According to this, for example, the texture (luxurious texture), mechanical strength, durability, and the like of the three-dimensional shaped article 10 can be further enhanced.

In particular, when the first particles 21 are constituted by a material containing a metal material, the luxurious texture, massive look, mechanical strength, toughness, and the like of the three-dimensional shaped article 10 can be particularly enhanced. Further, heat dissipation after applying energy for bonding the first particles 21 proceeds efficiently, and therefore, the productivity of the three-dimensional shaped article 10 can be particularly increased.

Examples of the metal material constituting the first particles 21 include magnesium, iron, copper, cobalt, titanium, chromium, nickel, an alloy containing at least one metal selected from these (for example, a maraging steel, stainless steel, cobalt-chromium-molybdenum, a titanium alloy, a nickel-based alloy, an aluminum alloy, and the like).

Examples of the metal compound constituting the first particles 21 include various metal oxides such as silica, alumina, titanium oxide, zinc oxide, zirconium oxide, tin oxide, magnesium oxide, and potassium titanate; various metal hydroxides such as magnesium hydroxide, aluminum hydroxide, and calcium hydroxide; various metal nitrides such as silicon nitride, titanium nitride, and aluminum nitride; various metal carbides such as silicon carbide and titanium carbide; various metal sulfides such as zinc sulfide; various metal carbonates such as calcium carbonate and magnesium carbonate; various metal sulfates such as calcium sulfate and magnesium sulfate; various metal silicates such as calcium silicate and magnesium silicate; various metal phosphates such as calcium phosphate; various metal borates such as aluminum borate and magnesium borate; and composites of these materials.

Examples of the resin material constituting the first particles 21 include polybutylene terephthalate, polyethylene terephthalate, polypropylene, polystyrene, syndiotactic polystyrene, polyacetal, modified polyphenylene ether, polyether ether ketone, polycarbonate, acrylonitrile-butadiene-styrene copolymers (ABS resins), polyether nitrile, polyamide (such as nylon), polyarylate, polyamideimide, polyetherimide, polyimide, liquid crystalline polymers, polysulfone, polyethersulfone, polyphenylene sulfide, and fluororesins.

The shape of the first particle 21 is not particularly limited, and may be any shape such as a spherical shape, a spindle shape, a needle shape, a cylindrical shape, or a scaly shape, further, the particle may have an irregular shape, but preferably has a spherical shape.

The average particle diameter of the first particles 21 is not particularly limited, but is preferably 0.1 µm or more and 20 µm or less, more preferably 0.2 µm or more and 10 µm or less.

According to this, the fluidity of the composition 2' can be made more favorable, and therefore, the layer formation step can be more smoothly performed, and also the bonding of the first particles 21 in the bonding step can be more favorably performed. In addition, for example, the removal or the like of the solvent, binder, or the like contained in the layer 1 can be efficiently performed, and thus, the constituent material other than the first particles 21 can be more effectively prevented from undesirably remaining in the final three-dimensional shaped article 10. Due to this, while further increasing the productivity of the three-dimensional shaped article 10, the reliability and mechanical strength of the three-dimensional shaped article 10 to be produced can be further increased, and the occurrence of undesirable irregularities or the like in the three-dimensional shaped article 10 to be produced can be more effectively prevented, and the dimensional accuracy of the three-dimensional shaped article 10 can be further enhanced.

The "average particle diameter" as used herein refers to an average particle diameter on a volume basis and can be determined by, for example, adding a sample to methanol, followed by dispersion for 3 minutes using an ultrasonic disperser, and then, measuring the resulting dispersion liquid using a particle size distribution analyzer employing a Coulter counter method (for example, model TA-II, manufactured by Coulter Electronics, Inc.) with an aperture of 50 μm.

The Dmax of the first particles 21 is preferably 0.2 μm or more and 25 μm or less, more preferably 0.4 μm or more and 15 μm or less.

According to this, the fluidity of the composition 2' can be made more favorable, and therefore, the layer formation step can be more smoothly performed, and also the bonding of the first particles 21 in the bonding step can be more favorably performed. As a result, while further increasing the productivity of the three-dimensional shaped article 10, the mechanical strength of the three-dimensional shaped article 10 to be produced can be further increased, and the occurrence of undesirable irregularities or the like in the three-dimensional shaped article 10 to be produced can be more effectively prevented, and the dimensional accuracy of the three-dimensional shaped article 10 can be further increased.

The content of the first particles 21 in the composition 2' is preferably 50 mass % or more and 99 mass % or less, more preferably 55 mass % or more and 70 mass % or less.

According to this, while further increasing the ease of handling of the composition 2', the amount of components to be removed in the process for producing the three-dimensional shaped article 10 can be further reduced, and therefore, it is particularly advantageous from the viewpoint of the productivity and production cost of the three-dimensional shaped article 10, the resource saving, and the like. In addition, the dimensional accuracy of the finally obtained three-dimensional shaped article 10 can be further increased.

The first particles 21 are constituted by a material which undergoes a chemical reaction (for example, an oxidation reaction or the like) in the process for producing the three-dimensional shaped article 10 (for example, the bonding step or the like), and the formulation of the first particles 21 contained in the composition 2' may be different from the formulation of the constituent material of the final three-dimensional shaped article 10.

The composition 2' may contain two or more types of first particles.

First Solvent

The composition 2' contains a solvent (first solvent).

By including the solvent (first solvent) in the composition 2', the first particles 21 can be favorably dispersed in the composition 2', and the ejection of the composition 2' by the dispenser M2 can be stably performed.

The solvent (first solvent) is not particularly limited as long as it has a function (a function as the dispersion medium) to favorably disperse the first particles 21 in the composition 2', but is preferably a volatile solvent.

The volatile solvent can be efficiently removed in the process for producing the three-dimensional shaped article 10, and therefore, it is possible to effectively prevent the occurrence of a problem caused by the solvent undesirably remaining in the finally obtained three-dimensional shaped article 10.

Examples of the first solvent include water; (poly)alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl n-butyl ketone, diisopropyl ketone, and acetyl acetone; alcohols such as ethanol, propanol, and butanol; tetra-alkyl ammonium acetates; sulfoxide-based solvents such as dimethyl sulfoxide and diethyl sulfoxide; pyridine-based solvents such as pyridine, picoline, and 2,6-lutidine; and ionic liquids such as tetra-alkyl ammonium acetate (for example, tetra-butyl ammonium acetate, etc.), and one type or two or more types in combination selected from these can be used.

In the case where the composition 2' contains the first particles 21 constituted by a metal material, it is preferred to use an aprotic solvent as the first solvent. According to this, an undesirable oxidation reaction or the like of the constituent material of the first particles 21 can be effectively prevented.

The content of the first solvent in the composition 2' is preferably 0.5 mass % or more and 70 mass % or less, more preferably 1 mass % or more and 50 mass % or less.

According to this, while further increasing the ease of handling of the composition 2', the amount of components to be removed in the process for producing the three-dimensional shaped article 10 can be further reduced, and therefore, it is particularly advantageous from the viewpoint of the productivity and production cost of the three-dimensional shaped article 10, the resource saving, and the like. In addition, the dimensional accuracy of the finally obtained three-dimensional shaped article 10 can be further increased.

Incidentally, as the first solvent, for example, a non-volatile solvent which is solidified by a polymerization reaction like a polymerizable monomer or the like may be used.

Binder

The composition 2' may further contain a binder having a function to temporarily bond the first particles 21 in the layer 1 in which the first solvent has been removed in addition to the first particles 21 and the first solvent.

According to this, for example, undesirable deformation of the pattern formed using the composition 2' can be more effectively prevented. As a result, the dimensional accuracy of the three-dimensional shaped article 10 can be further enhanced. In addition, the void ratio (porosity) in the three-dimensional shaped article 10, the density of the three-dimensional shaped article 10, and the like can be favorably adjusted.

The binder may be any as long as it has a function to temporarily fix the first particles 21 in the composition 2' (that is, the pattern formed using the composition 2') before being subjected to the bonding step, and for example, any of various resin materials and the like such as a thermoplastic resin and a curable resin can be used.

In the case where a curable resin is contained, a curing reaction of the curable resin may be performed at a timing after the composition 2' is ejected and before the bonding step is performed.

According to this, undesirable deformation of the pattern formed using the composition 2' can be more effectively prevented, and the dimensional accuracy of the three-dimensional shaped article 10 can be further enhanced.

A curing treatment of allowing the curing reaction of the curable resin to proceed can be performed by, for example, heating or irradiation with an energy ray such as a UV ray.

As the curable resin, for example, any of various thermosetting resins, photocurable resins, and the like can be favorably used.

As the curable resin (polymerizable compound), for example, any of various monomers, various oligomers (including dimers, trimers, and the like), prepolymers, and the like can be used, however, it is preferred that the composition 2' contains at least a monomer component as the curable resin (polymerizable compound). A monomer is generally a component having a lower viscosity than an oligomer component or the like, and therefore is advantageous for further increasing the ejection stability of the curable resin (polymerizable compound).

As the curable resin (polymerizable compound), a compound whose addition polymerization or ring-opening polymerization is initiated by a radical species, a cationic species, or the like generated from a polymerization initiator by irradiation with an energy ray, thereby forming a polymer is preferably used. Examples of the polymerization form of the addition polymerization include radical, cationic, anionic, metathesis, and coordination polymerization. Further, examples of the polymerization form of the ring-opening polymerization include cationic, anionic, radical, metathesis, and coordination polymerization.

The composition 2' may contain an oligomer (including a dimer, a trimer, or the like), a prepolymer, or the like other than the monomer as the curable resin (polymerizable compound).

In the composition 2', the binder may be contained in any form, but it is preferably in the form of a liquid (for example, in a molten state, a dissolved state, or the like). That is, the binder is preferably contained as a constituent component of the dispersion medium 22.

According to this, the binder can function as the dispersion medium 22 for dispersing the first particles 21, and the ejection property of the composition 2' can be further enhanced. Further, the binder can favorably cover the first particles 21 in the bonding step, so that the stability of the shape of the pattern (the pattern formed using the composition 2') when performing the bonding step can be further increased, and thus, the dimensional accuracy of the three-dimensional shaped article 10 can be further increased.

The content of the binder in the composition 2' is preferably 0.1 mass % or more and 48 mass % or less, more preferably 0.8 mass % or more and 10 mass % or less.

According to this, while making the fluidity of the composition 2' in the layer formation step more appropriate, the function to temporarily fix the first particles 21 of the binder can be more effectively exhibited. In addition, the removal of the binder in the bonding step can be more reliably performed. As a result, while further increasing the productivity of the three-dimensional shaped article 10, the dimensional accuracy and reliability of the three-dimensional shaped article 10 to be produced can be further increased.

Other Component

The composition 2' may contain a component other than the above-mentioned components. Examples of such a component include a polymerization initiator, a dispersant, a surfactant, a thickener, an anti-aggregation agent, a defoaming agent, a slipping agent (leveling agent), a dye, a polymerization inhibitor, a polymerization accelerator, a permeation accelerator, a wetting agent (humectant), a fixing agent, an antifungal agent, a preservative, an antioxidant, a UV absorber, a chelating agent, and a pH adjusting agent.

Sacrificial Part Forming Composition

Next, the sacrificial part forming composition (composition) 5' to be used for producing the three-dimensional shaped article 10 will be described.

The sacrificial part forming composition 5' is a composition to be used for forming the sacrificial part 5. The sacrificial part (support part) 5 has a function to support a portion to become the actual body part 2 of the three-dimensional shaped article 10 in the process for producing the three-dimensional shaped article 10.

The sacrificial part forming composition (composition) 5' contains second particles and a second solvent.

Hereinafter, the constituent components of the composition 5' will be described.

Second Particles

The sacrificial part forming composition 5' contains a plurality of second particles.

By including the particles (second particles) in the sacrificial part forming composition 5', even in the case where the sacrificial part 5 to be formed has a fine shape or the like, the sacrificial part 5 can be efficiently formed with high dimensional accuracy.

Examples of the constituent material of the second particles constituting the sacrificial part forming composition 5' include metal materials, metal compounds (such as ceramics), resin materials, and pigments.

However, it is preferred that the second particles constituting the sacrificial part forming composition 5' are constituted by a material having a higher melting point than that of the first particles 21 constituting the composition 2'.

The shape of the second particle is not particularly limited, and may be any shape such as a spherical shape, a spindle shape, a needle shape, a cylindrical shape, or a scaly shape, further, the particle may have an irregular shape, but preferably has a spherical shape.

The average particle diameter of the second particles is not particularly limited, but is preferably 0.1 µm or more and 20 µm or less, more preferably 0.2 µm or more and 10 µm or less.

According to this, the fluidity of the sacrificial part forming composition 5' can be made more favorable, and therefore, the layer formation step can be more smoothly performed, and also the bonding of the second particles in the bonding step can be more favorably performed. In addition, for example, the removal or the like of the second solvent, binder, or the like contained in the layer 1 can be efficiently performed, and thus, the constituent material other than the second particles can be more effectively prevented from undesirably remaining in the final three-dimensional shaped article 10. As a result, while further increasing the productivity of the three-dimensional shaped article 10, the occurrence of undesirable irregularities or the like in the three-dimensional shaped article 10 to be produced can be more effectively prevented, and the dimensional accuracy of the three-dimensional shaped article 10 can be further enhanced.

The Dmax of the second particles is preferably 0.2 µm or more and 25 µm or less, more preferably 0.4 µm or more and 15 µm or less.

According to this, the fluidity of the sacrificial part forming composition 5' can be made more favorable, and therefore, the supply of the sacrificial part forming composition 5' can be more smoothly performed, and also the bonding of the second particles in the bonding step can be more favorably performed. As a result, while further increasing the productivity of the three-dimensional shaped article 10, the occurrence of undesirable irregularities or the like in the three-dimensional shaped article 10 to be produced can be more effectively prevented, and the dimensional accuracy of the three-dimensional shaped article 10 can be further increased.

The content of the second particles in the sacrificial part forming composition 5' is preferably 50 mass % or more and 99 mass % or less, more preferably 55 mass % or more and 98 mass % or less.

According to this, while further increasing the ease of handling of the sacrificial part forming composition 5', the amount of components to be removed in the process for producing the three-dimensional shaped article 10 can be further reduced, and therefore, it is particularly advantageous from the viewpoint of the productivity and production cost of the three-dimensional shaped article 10, the resource saving, and the like. In addition, the dimensional accuracy of the finally obtained three-dimensional shaped article 10 can be further increased.

The sacrificial part forming composition 5' may contain two or more types of second particles.

Second Solvent

The sacrificial part forming composition 5' contains a solvent (second solvent).

By including the solvent (second solvent) in the sacrificial part forming composition 5', the second particles can be favorably dispersed in the sacrificial part forming composition 5', and the ejection of the sacrificial part forming composition 5' by the dispenser M3 can be stably performed.

The solvent (second solvent) is not particularly limited as long as it has a function (a function as the dispersion medium) to favorably disperse the second particles in the sacrificial part forming composition 5', but is preferably a volatile solvent.

The volatile solvent can be efficiently removed in the process for producing the three-dimensional shaped article 10, and therefore, it is possible to effectively prevent the occurrence of a problem caused by the solvent undesirably remaining in the finally obtained three-dimensional shaped article 10.

As the solvent (second solvent) contained in the sacrificial part forming composition 5', for example, a solvent described as the constituent component of the composition 2' or the like can be used.

Incidentally, the solvent (first solvent) contained in the composition 2' and the solvent (second solvent) contained in the sacrificial part forming composition 5' may have the same conditions (for example, the same formulation or the like), or may have different conditions.

The content of the second solvent in the sacrificial part forming composition 5' is preferably 0.5 mass % or more and 30 mass % or less, more preferably 1 mass % or more and 25 mass % or less.

According to this, while further increasing the ease of handling of the sacrificial part forming composition 5', the amount of components to be removed in the process for producing the three-dimensional shaped article 10 can be further reduced, and therefore, it is particularly advantageous from the viewpoint of the productivity and production cost of the three-dimensional shaped article 10, the resource saving, and the like. In addition, the dimensional accuracy of the finally obtained three-dimensional shaped article 10 can be further increased.

Binder

The sacrificial part forming composition 5' may further contain a binder having a function to temporarily bond the second particles in the layer 1 in which the second solvent has been removed in addition to the second particles and the second solvent.

According to this, for example, undesirable deformation of the sacrificial part 5 formed using the sacrificial part forming composition 5' can be more effectively prevented. As a result, the dimensional accuracy of the three-dimensional shaped article 10 can be further enhanced.

The binder may be any as long as it has a function to temporarily fix the second particles in the sacrificial part forming composition 5' before being subjected to the bonding step, and for example, any of various resin materials and the like such as a thermoplastic resin and a curable resin can be used.

In the case where a curable resin is contained, a curing reaction of the curable resin may be performed at a timing after the sacrificial part forming composition 5' is ejected and before the bonding step is performed.

According to this, undesirable deformation of the pattern formed using the sacrificial part forming composition 5' (sacrificial part 5) can be more effectively prevented, and the dimensional accuracy of the three-dimensional shaped article 10 can be further enhanced.

A curing treatment can be performed by, for example, heating or irradiation with an energy ray such as a UV ray.

In the case where the sacrificial part forming composition 5' contains a curable resin, as the curable resin, for example, a curable resin described as the constituent component of the composition 2' or the like can be used.

Incidentally, the curable resin contained in the composition 2' and the curable resin contained in the sacrificial part forming composition 5' may have the same conditions (for example, the same formulation or the like), or may have different conditions.

The content of the binder in the sacrificial part forming composition 5' is preferably 0.5 mass % or more and 48 mass % or less, more preferably 1 mass % or more and 43 mass % or less.

According to this, while making the fluidity of the sacrificial part forming composition 5' in the layer formation step more appropriate, the function to temporarily fix the particles of the binder can be more effectively exhibited. In addition, the removal of the binder in the bonding step can be more reliably performed. As a result, while further increasing the productivity of the three-dimensional shaped article 10, the dimensional accuracy and reliability of the three-dimensional shaped article 10 to be produced can be further increased.

Other Component

The sacrificial part forming composition 5' may contain a component other than the above-mentioned components. Examples of such a component include a polymerization initiator, a dispersant, a surfactant, a thickener, an anti-aggregation agent, a defoaming agent, a slipping agent (leveling agent), a dye, a polymerization inhibitor, a polymerization accelerator, a permeation accelerator, a wetting agent (humectant), a fixing agent, an antifungal agent, a preservative, an antioxidant, a UV absorber, a chelating agent, and a pH adjusting agent.

Three-Dimensional Shaped Article

The three-dimensional shaped article according to the invention can be produced using the three-dimensional shaped article production apparatus according to the invention as described above.

According to this, a three-dimensional shaped article having high dimensional accuracy can be provided. Further, according to the production method and the production apparatus as described above, particles having various formulations can be used, and therefore, the range of choice of the constituent material of the three-dimensional shaped article can be expanded, and the three-dimensional shaped article having desired physical properties, texture, etc. can be favorably formed.

The use of the three-dimensional shaped article according to the invention is not particularly limited, however, examples of the use include ornaments and exhibits such as dolls and figures; and medical devices such as implants.

Further, the three-dimensional shaped article according to the invention may be applied to any of prototypes, mass-produced products, and custom-made products.

Hereinabove, preferred embodiments of the invention have been described, however, the invention is not limited thereto.

For example, in the three-dimensional shaped article production apparatus according to the invention, the configuration of each section can be replaced with an arbitrary configuration exhibiting a similar function, and also an arbitrary configuration can be added.

For example, the three-dimensional shaped article production apparatus according to the invention may include a depressurization unit (not shown). According to this, for example, the solvent can be efficiently removed from the ejected composition (the actual body part forming composition or the sacrificial part forming composition), and thus, the productivity of the three-dimensional shaped article can be particularly increased.

Further, the three-dimensional shaped article production apparatus according to the invention may include a heating unit for removing the solvent from the ejected composition (the actual body part forming composition or the sacrificial part forming composition). According to this, the productivity of the three-dimensional shaped article can be particularly increased.

Further, the three-dimensional shaped article production method according to the invention is not limited to the method performed by using the three-dimensional shaped article production apparatus as described above.

Further, in the above-mentioned embodiments, a case where the layer of the first layer is constituted by only the second portion and is formed as a sacrificial layer which does not have the first portion, however, the layer of the first layer may be formed as a layer which has the first portion.

Further, in the above-mentioned embodiments, a case where the layer is directly formed on the surface of the stage is representatively described, however, for example, a shaping plate is placed on the stage, and the three-dimensional shaped article may be produced by stacking the layers on the shaping plate.

Further, in the above-mentioned embodiments, a case where the measurement step is performed after performing the layer formation step for all the layers except for the uppermost layer is representatively described, however, in the invention, the measurement step may be performed for only at least some of the layers constituting the stacked body. In addition, the measurement step may be performed also for the uppermost layer after performing the layer formation step.

Further, the above-mentioned embodiments are described under the assumption that the height of the layer 1 (the height of the n-th layer) in the case where n is an integer of 2 or more refers to a height corresponding to a thickness obtained by accumulating the thicknesses of the respective layers from the first layer to the n-th layer, however, as the height of the layer 1 (the height of the n-th layer) in the case where n is an integer of 2 or more, the thickness of the n-th layer alone may be used. For example, in the case where the layer 1 to be measured is viewed in a top view, the thickness can be measured based on a place where the surface of the layer 1 positioned beneath the layer 1 to be measured is exposed.

Further, in the three-dimensional shaped article production method according to the invention, the order of the steps or the treatments is not limited to the above-mentioned order, and at least some of them may be performed by changing the order. For example, in the above-mentioned embodiments, a case where the sacrificial part forming composition is ejected after the actual body part forming composition is ejected in the layer formation step of forming an arbitrary layer is representatively described, however, the actual body part forming composition may be ejected after the sacrificial part forming composition is ejected, or the actual body part forming composition and the sacrificial part forming composition may be ejected simultaneously.

Further, in the above-mentioned embodiments, a case where in the bonding step, the bonding of the particles contained in the actual body part forming composition is performed, but the bonding of the particles contained in the sacrificial part forming composition is not performed is mainly described, however, in the bonding step, the bonding of the particles contained in the sacrificial part forming composition may be performed along with the bonding of the particles contained in the actual body part forming composition.

Further, in the production method according to the invention, a pre-treatment step, an intermediate treatment step, or a post-treatment step may be performed as needed.

Examples of the pre-treatment step include a stage cleaning step.

Examples of the post-treatment step include a washing step, a shape adjustment step in which deburring or the like is performed, a coloring step, a coating layer formation step, and a heating treatment step for increasing the bonding strength between the particles.

Further, in the case where the composition (at least one of the actual body part forming composition and the sacrificial part forming composition) contains a binder, a binder removal step may be further included as a step separately from the bonding step. More specifically, for example, for a stacked body in which a plurality of layers are stacked, before performing the bonding step (sintering step), a degreasing step may be included as the binder removal step.

Further, in the above-mentioned embodiments, a case where all the above-mentioned steps are performed in the same apparatus (three-dimensional shaped article production apparatus) is representatively described, however, some of the steps of the three-dimensional shaped article production method may be performed in another apparatus. For example, the bonding treatment (sintering treatment) for the stacked body may be performed using an apparatus (a sintering furnace or the like) which is different from the apparatus for performing the formation of the layers and the measurement of the heights of the layers.

The entire disclosure of Japanese Patent Application No. 2016-043676, filed Mar. 7, 2016 is expressly incorporated by reference herein.

What is claimed is:

1. A three-dimensional shaped article production method for producing a three-dimensional shaped article by stacking layers, the method comprising:
   a layer formation step of forming a layer in a predetermined pattern by ejecting a composition containing particles and a binder using a dispenser, the particles being configured with first and second particles, the binder being configured with first and second binder;

a measurement step of determining the height of the layer;

a repeating step of repeating the layer formation step and the measurement step a plurality of times so as to form a stacked body including a plurality of the layers; and a bonding step of subjecting the stacked body to a bonding treatment for bonding the particles in the plurality of the layers, wherein at least some of the plurality of the layers constituting the stacked body have a first portion corresponding to a portion to become an actual body part of the three-dimensional shaped article to be formed using an actual body part forming composition containing the first particles and the first binder, and have a second portion corresponding to a portion to become a sacrificial part to be formed using a sacrificial part forming composition containing the second particles and the second binder, and n represents an arbitrary integer of 1 or more, and when an n-th layer which is in an n-th position of the plurality of the layers has the second portion and when the second portion of an (n+1)th layer which is in an (n+1)th position of the plurality of the layers will be formed in at least part of a surface of the second portion of the n-th layer, a supply amount of the sacrificial part forming composition per unit area to be ejected onto the second portion of the n-th layer from the dispenser in the layer formation step of forming the (n+1)th layer is adjusted based on the height of the surface of the second portion of the n-th layer, wherein, in the measurement step, the height of the n-th layer is determined by measuring heights at a plurality of locations on a surface of the n-th layer on which the (n+1)th layer will be formed, and in the layer formation step, a supply amount of the composition per unit area for forming the (n+1) layer is adjusted to make a combined height of the n-th layer and the (n+1)th layer a predetermined height, and when the combined height is more than the predetermined height, a discharge rate of the composition per unit area is decreased, and when the combined height is less than the predetermined height, the discharge rate of the composition per unit area is increased.

2. The three-dimensional shaped article production method according to claim 1, wherein the supply amount of the sacrificial part forming composition per unit area to be ejected onto the second portion of the n-th layer is adjusted by adjusting a number of liquid droplets of the sacrificial part forming composition per unit area to be ejected onto the n-th layer from the dispenser.

3. The three-dimensional shaped article production method according to claim 2, wherein in the layer formation step of forming the n-th layer, the number of the liquid droplets of the sacrificial part forming composition per unit area is set to a predetermined value, and in the layer formation step of forming the (n+1)th layer, the supply amount of the sacrificial part forming composition per unit area is adjusted by selecting at least one of a value which is smaller than the predetermined value and a value which is larger than the predetermined value as the number of the liquid droplets per unit area of the sacrificial part forming composition.

4. The three-dimensional shaped article production method according to claim 1, wherein the supply amount of the sacrificial part forming composition per unit area to be ejected onto the second portion of the n-th layer is adjusted by selecting waveform data from a data group including a plurality of the waveform data, and the plurality of the wave data is used for ejecting the sacrificial part forming composition from the dispenser.

5. The three-dimensional shaped article production method according to claim 4, wherein the plurality of the waveform data in the data group includes reference driving waveform data for ejecting a predetermined ejection amount, first driving waveform data for ejecting a decreased amount such that the ejection amount is smaller than the reference driving waveform data, and second driving waveform data for ejecting an increased amount such that the ejection amount is larger than the reference driving waveform data, and in the layer formation step of forming the n-th layer, the reference driving waveform data is used, and in the layer formation step of forming the (n+1)th layer, the supply amount of the sacrificial part forming composition per unit area is adjusted by using at least one of the first driving waveform data and the second driving waveform data.

6. The three-dimensional shaped article production method according to claim 1, wherein, in the measurement step, the height of the surface of a first position of the second portion of the n-th layer is measured, the second portion of the (n+1) layer is formed on the first position, and the first portion of an (n+2) layer which is in an (n+2)th position of the plurality of the layers is overlapped with the first position.

7. The three-dimensional shaped article production method according to claim 1, wherein in the measurement step, the height of the surface of second position of the second portion of the n-th layer is also measured, and the first portion of the (n+1)th layer is formed on the second position.

8. The three-dimensional shaped article production method according to claim 1, wherein in the measurement step, the height of the surface of the first portion of the n-th layer is also measured.

9. The three-dimensional shaped article production method according to claim 1, wherein the measurement step for the n-th layer is performed after performing a binder removal step of removing the binder from a height measurement portion of the n-th layer.

* * * * *